(12) United States Patent
Tomita et al.

(10) Patent No.: US 7,446,816 B2
(45) Date of Patent: Nov. 4, 2008

(54) IMAGE FORMING APPARATUS CAPABLE OF FORMING IMAGE FOR BROADCASTING PROGRAM AT PROPER TIMING

(75) Inventors: Atsushi Tomita, Toyohashi (JP); Hideki Hino, Toyokawa (JP); Hideo Mae, Okazaki (JP); Yuji Kawamura, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 400 days.

(21) Appl. No.: 10/762,537

(22) Filed: Jan. 23, 2004

(65) Prior Publication Data

US 2004/0263895 A1 Dec. 30, 2004

(30) Foreign Application Priority Data

Jan. 27, 2003 (JP) ............................. 2003-017720

(51) Int. Cl.
*H04N 7/00* (2006.01)
*H04N 11/00* (2006.01)
*G06F 3/12* (2006.01)

(52) U.S. Cl. .................. 348/460; 348/552; 358/1.15

(58) Field of Classification Search ................ 348/552, 348/553, 460, 473; 358/1.15; 725/133, 141, 725/153; 710/8, 10, 11, 12
See application file for complete search history.

(56) References Cited

U.S. PATENT DOCUMENTS

| | | | | |
|---|---|---|---|---|
| 3,848,082 A | * | 11/1974 | Summers ..................... | 348/473 |
| 4,148,066 A | * | 4/1979 | Saylor ........................ | 358/1.6 |
| 4,587,569 A | * | 5/1986 | Nakamura et al. .......... | 358/296 |
| 4,600,808 A | * | 7/1986 | Cosentino et al. ......... | 379/93.25 |
| 4,695,880 A | * | 9/1987 | Johnson et al. ............. | 725/144 |
| 4,903,334 A | * | 2/1990 | Anderson ................... | 455/295 |
| 5,070,404 A | * | 12/1991 | Bullock et al. .............. | 348/460 |

(Continued)

FOREIGN PATENT DOCUMENTS

JP        60-032448        2/1985

(Continued)

OTHER PUBLICATIONS

A Notice of Grounds of Rejection, mailed Oct. 30, 2007, issued in corresponding Japanese Patent Application No. 017720/2003, and translation thereof.

(Continued)

*Primary Examiner*—Victor R Kostak
(74) *Attorney, Agent, or Firm*—Buchanan Ingersoll & Rooney PC

(57) ABSTRACT

A data broadcasting receiving terminal receives a data broadcasting signal from a broadcasting station to detect print-out data and a control signal associated with print-out from the data broadcasting signal. The data broadcasting receiving terminal, at a time point of the start of broadcasting, notifies an image forming apparatus of the detected print-out data and printing prohibition data included in the control signal associated with print-out. The data broadcasting receiving terminal acquires a preparation time required for print-out from the image forming apparatus and a time of restoration from a power saving mode and issues a command of printing start, in consideration of the time requirements, to the image forming apparatus so that print-out data is printed out at predetermined timing.

12 Claims, 11 Drawing Sheets

U.S. PATENT DOCUMENTS

| | | | |
|---|---|---|---|
| 5,283,734 | A | 2/1994 | Von Kohorn |
| 5,369,441 | A * | 11/1994 | Enari .......................... 348/559 |
| 5,453,015 | A | 9/1995 | Vogel |
| 5,488,423 | A * | 1/1996 | Walkingshaw et al. ........ 725/24 |
| 5,500,681 | A * | 3/1996 | Jones .......................... 348/473 |
| 5,668,592 | A * | 9/1997 | Spaulding, II ............... 725/134 |
| 5,802,382 | A * | 9/1998 | Greenberger et al. ......... 712/36 |
| 5,857,149 | A | 1/1999 | Suzuki |
| 5,862,372 | A * | 1/1999 | Morris et al. ................ 717/109 |
| 5,946,026 | A | 8/1999 | Suzuki |
| 6,049,532 | A * | 4/2000 | Steele et al. ................. 370/311 |
| 6,064,772 | A * | 5/2000 | Tanno et al. ................. 382/236 |
| 6,633,410 | B1 * | 10/2003 | Narushima .................. 358/1.9 |
| 6,636,902 | B2 * | 10/2003 | Ihara .............................. 710/5 |
| 6,774,951 | B2 * | 8/2004 | Narushima .................. 348/552 |
| 6,774,954 | B1 | 8/2004 | Narushima |
| 6,867,887 | B1 * | 3/2005 | Meyer ......................... 358/500 |
| 6,870,571 | B1 * | 3/2005 | Narushima et al. ........... 348/552 |
| 6,925,509 | B2 * | 8/2005 | Ihara et al. ..................... 710/62 |
| 7,079,191 | B1 * | 7/2006 | Kitamura et al. ............. 348/552 |
| 2001/0028408 | A1 * | 10/2001 | Arima .......................... 348/460 |
| 2002/0060748 | A1 * | 5/2002 | Aratani et al. ............... 348/552 |
| 2002/0097879 | A1 | 7/2002 | Hasegawa |
| 2003/0002056 | A1 * | 1/2003 | Yamaguchi et al. ........... 358/1.2 |
| 2003/0054859 | A1 * | 3/2003 | Goto ........................... 455/557 |
| 2003/0164976 | A1 * | 9/2003 | Ihara et al. .................. 358/1.15 |
| 2004/0169728 | A1 * | 9/2004 | Kuwano et al. ........... 348/207.2 |
| 2004/0196484 | A1 * | 10/2004 | Masumoto et al. .......... 358/1.13 |
| 2005/0151881 | A1 * | 7/2005 | Yamaguchi et al. ......... 348/552 |

FOREIGN PATENT DOCUMENTS

| | | |
|---|---|---|
| JP | 04-501075 | 2/1992 |
| JP | 04-365227 | 12/1992 |
| JP | 05-344084 | 12/1993 |
| JP | 06-319140 | 11/1994 |
| JP | 08-08849 | 1/1996 |
| JP | 8-65256 | 3/1996 |
| JP | 08-088613 | 4/1996 |
| JP | 11-102550 | 4/1999 |
| JP | 11-341423 | 12/1999 |
| JP | 2000-101979 | 4/2000 |
| JP | 2001-237783 | 8/2001 |
| JP | 2001-320690 | 11/2001 |
| JP | 2002-217849 | 8/2002 |
| JP | 08-065256 | 3/2006 |
| WO | WO 95/33318 | 12/1995 |

OTHER PUBLICATIONS

Yoshikazu Tomita, "Receiver Development - 3 Papala G-Com", DARC System FM Multiplex Broadcasting Technology, Triceps, May 1, 1998, pp. 163-171.

"Are You Having A Problem?", BJ F900 Start Guide, Cannon Inc. 2001, pp. 60-66.

Notice of Grounds of Rejection, mailed Jan. 29, 2008, issued in corresponding Japanese Patent Application No. 017720/2003, and translation thereof.

* cited by examiner

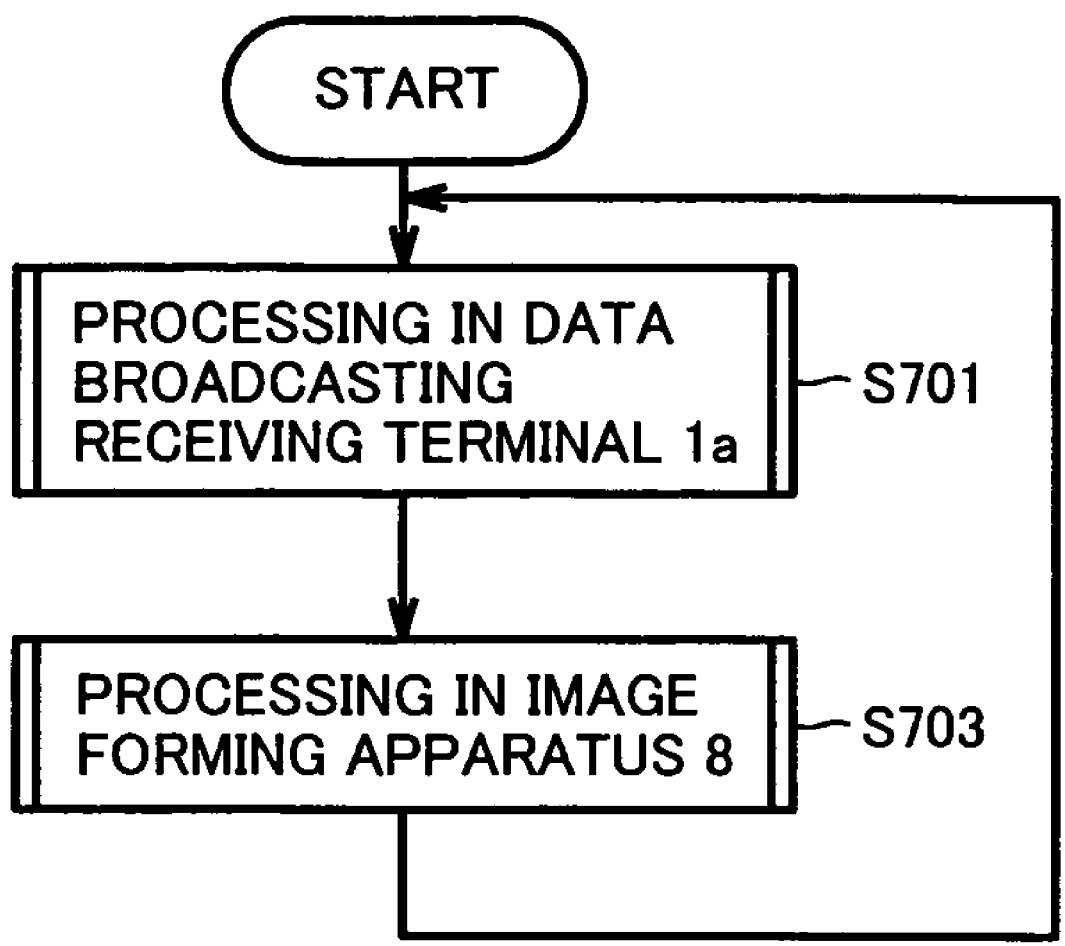

IMAGE FORMING APPARATUS CAPABLE OF FORMING IMAGE FOR BROADCASTING PROGRAM AT PROPER TIMING

This application is based on Japanese Patent Application No. 2003-17720 filed with Japan Patent Office on Jan. 27, 2003, the entire content of which is hereby incorporated by reference.

BACKGROUND OF THE INVENTION

1. Field of the Invention

The present invention relates to an image forming apparatus, a printing system, an information processing apparatus, a data transmission method and a data transmission program product and, more particularly, to an image forming apparatus, a printing system, an information processing apparatus, a data transmission method and a data transmission program product for forming an image of print-out data multiplexed in a vertical retrace line blanking interval of a television broadcasting or print-out data transmitted with service information data of digital television broadcasting.

2. Description of the Related Art

For purposes to effectively use a broadcasting radio wave and to achieve more improvement on service in television broadcasting, various kinds of teletext data associated with a program in television broadcasting have been multiplexed and transmitted in a specific horizontal scanning period thereof, which is a vertical retrace line blanking interval. Various kinds of information are included in the teletext data, and demodulation and reproduction of code data such as characters and pictures constituting a teletext program are carried out in a teletext receiver to display the code data on a television screen.

Digital television broadcasting, in recent years, has been put into practice: in which system an image and a sound are digitally compressed and transmitted. In digital television broadcasting, service information data including various kinds of information associated with a program is transmitted in addition to broadcast images.

As a system using such teletext data and service information data, a teletext receiver is disclosed in Japanese Laid-Open Patent Publication No. 2000-101979 in which it is possible that teletext data multiplexed in a vertical retrace line blanking interval of a television broadcasting signal is demodulated to discriminate and extract URL (Uniform Resource Locators), the extracted URL is stored and the stored URL is accessed to display a web page.

An information processing apparatus, which is a printer with a television tuner, is disclosed in Japanese Laid-Open Patent Publication No. 11-341423, in which a text and a still picture or an illustration are taken out from information of teletext or data broadcasting included in a specified television broadcasting radio wave to process them into a predetermined layout and to output the layout to an image forming apparatus at a predetermined time point or an arbitrary time point.

A data broadcasting receiver is disclosed in Japanese Laid-Open Patent Publication No. 11-102550 in which broadcasting data including data corresponding to data specified by a viewer in advance is stored together with a video signal and a sound signal to which the viewer specific broadcasting data is multiplexed.

In such a broadcasting program, a case is imagined where, to be concrete, in an educational program, a small test is performed in the latter half thereof in order to confirm a degree of understanding. In such a case, a necessity arises for transmitting service information on the small test in the course of a program in display to print out a test paper on the receiver side. The reason therefor is that if the test paper was distributed or printed out in advance, a lecture participant would know a problem in advance, which disables a correct result thereof to be attained.

It is also conceived to offer a presentation through broadcasting by transmitting broadcasting data including document information. In such a case as well, the documents is required to be printed out at a proper timing. The reason why is that if a timing at which the documents are printed out was not proper to distribute or print out the documents in advance, an effect of the presentation would be reduced.

In actual television broadcasting, however, a case also arises where a program is interrupted and postponed by occurrence of a disaster or a serious incident. In such a case, a problem has remained unsolved that print-out cannot be realized at a desired timing in the teletext receiver, the information processing apparatus or the data broadcasting receiver disclosed in the above patent literatures.

An image forming apparatus has a case where an immediate print-out is disabled because of paper-out or the like. In such a case either, in the teletext receiver, the information processing apparatus or the data broadcasting receiver disclosed in the patent literatures 1 to 3, there have been a problem of possibility that a chance arises that an immediate print-out is not done at a timing at which print-out should be done in the teletext receiver, the information processing apparatus or the data broadcasting receiver disclosed in the patent literatures; a program progresses while print paper sheets are supplemented and when print-out is restarted, a necessary timing of print-out has passed too long. That is, in the above example, a case is also thought where answers of the small test have already been started in broadcasting while a paper sheet of the small test is still printed out. In this case, a problem has also occurred that the paper sheet of the small test printed out at a timing other than proper only to consume paper sheets useless.

An image forming apparatus usually has a power saving mode in order to suppress power consumption and a temperature in a fixing apparatus is controlled to be low in the power saving mode. Therefore, in the power saving mode, no immediate print-out is impossible. That is, print-out cannot be done immediately when a timing of print-out is right in the power saving mode of the teletext receiver, the information processing apparatus or the data broadcasting receiver disclosed in the patent literatures and print-out starts after a temperature of the fixing apparatus rises up to a fixable temperature. Therefore, a problem of a possibility has occurred that when print-out starts, a necessary timing for print-out is lost already. That is, in the above example, when a paper sheet for the small test is being printed out, a case also arises where the answers for the small test are already in the course of broadcasting. In such a case, a problem has also occurred that the paper sheet of the small test printed out at a timing other than proper only to consume paper sheets useless.

In the teletext receiver, the information processing apparatus or the data broadcasting receiver disclosed in the patent literatures, a problem has also occurred that print-out data to be scheduled to be printed out is received and thereafter, the data is held till a timing at which the start of print-out is just fit, whereas if print-out cannot be done at a desired timing, an image to be scheduled for print-out is left in an image forming apparatus to reduce a storage capacity thereof.

It is also conceived to acquire a broadcasting image through the Internet to use in a broadcasting program. To be concrete, it is conceived that the data of an educational program is acquired through the Internet to thereby take a lecture.

In such a case, a lecture participant commonly issues a print command manually after a timing of print-out comes. Therefore, a problem of possibility has arisen that when print-out completes, a necessary timing for the print-out has been lost. That is, in the above example, a problem has also arisen that when print-out of a paper sheet for the small test is printed out, a time during which the small test is to be answered has been consumed by a greater part or has elapsed already. In a case where a broadcasting program is received through the Internet, a reproduction time differs according to a performance of a personal computer, which is a receiver; therefore, a problem has also arisen that it is hard to realize an output method for outputting the broadcasting program to an image forming apparatus at a predetermined time point, which is described in Japanese Laid-Open Patent Publication No. 11-341423.

SUMMARY OF THE INVENTION

It is accordingly an object of the present invention to provide an image forming apparatus, a printing system, an information processing apparatus, a data transmission method and a data transmission program, capable of forming an image for a broadcasting program at a proper timing.

The object of the present invention can be achieved by an image forming apparatus including the following constructional elements. That is, the image forming apparatus includes: a reception section receiving a data broadcasting signal including print-out data and a control signal associated with print-out; a detection section detecting the print-out data and the control signal associated with print-out from the received data broadcasting signal; a storage section storing the detected print-out data into a memory apparatus; and an output section printing out the print-out data stored in the memory apparatus based on the detected control signal associated with print-out.

According to another aspect of the present invention, a printing system is comprising a data broadcasting receiving terminal and an image forming apparatus, the data broadcasting receiving terminal includes: a reception section receiving a data broadcasting signal including print-out data and a control signal associated with print-out; a detection section detecting the print-out data and the control signal associated with print-out from the received data broadcasting signal; a first notification section notifying the image forming apparatus of the detected print-out data; and a second notification section notifying the image forming apparatus of the detected control signal associated with print-out, and the image forming apparatus includes: a storage section storing the print-out data notified from the data broadcasting receiving terminal by the first notification section in a memory apparatus; and an output section printing out the print-out data stored in the memory apparatus based on the control signal associated with print-out notified from the data broadcasting receiving terminal by the second notification section.

According to still another aspect of the present invention, a printing system is comprising a data broadcasting receiving terminal and an image forming apparatus, the data broadcasting receiving terminal includes: a detection section detecting print-out data and a control signal associated with print-out from a broadcasting signal that the data broadcasting receiving terminal has received; a notification section notifying the image forming apparatus of the detected print-out data; a printing start notifying section, in a case where the detected control signal associated with print-out is a signal indicating the start of print-out of the print data, notifying the image forming apparatus of printing start data commanding the start of print-out of the print-out data; and a printing inhibition notifying section, in a case where the detected control signal associated with print-out is a signal indicating prohibition of print-out of the print-out data, notifying the image forming apparatus of printing prohibition data commanding prohibition of print-out of the print-out data.

According to yet another aspect of the present invention, an information processing apparatus includes: an acquirement section acquiring a program from a predetermined access target; a reception section executing the acquired program to thereby receive information including video information and print-out data; a separation section separating the video information and the print-out data from the received information; a storage section storing the separated print-out data in a memory apparatus; and a commanding section issuing a command for printing out the print-out data stored in the memory apparatus to the image forming apparatus at a predetermined timing in reproduction of the separated vide information.

According to yet another aspect of the present invention, a data transmission method includes the steps of: transmitting print-out data for print-out together with video information as a first transmission step; and transmitting a control signal associated with print-out of the print-out data together with the video information, linking with a timing at which the video information is reproduced as a second transmission step.

According to yet another aspect of the present invention, a data transmission program product includes a program causing a computer to execute data transmission processing including the steps of: detecting print-out data from a received data broadcasting signal as a first detection step; detecting a control signal associated with print-out from the received broadcasting signal as a second detection step; sending out the print-out data detected in the first detection section to an image forming apparatus as a sending out step; and issuing a print-out command for the print-out data to the image forming apparatus based on the control signal associated with print-out detected in the second detection step as a commanding step.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a flowchart showing processing in the data broadcasting receiving terminal 1a.

FIG. 11 is a flowchart showing processing in the image forming apparatus 100a.

DESCRIPTION OF THE PREFERRED EMBODIMENT

Description will be given of an embodiment of the present invention below with reference to the accompanying drawings. The same marks are attached to the same constituent and constructional elements in the following description. The names and functions thereof are the same. Therefore, no detailed description thereof will be repeated.

(1) Configuration of Printing System

Figure 1:
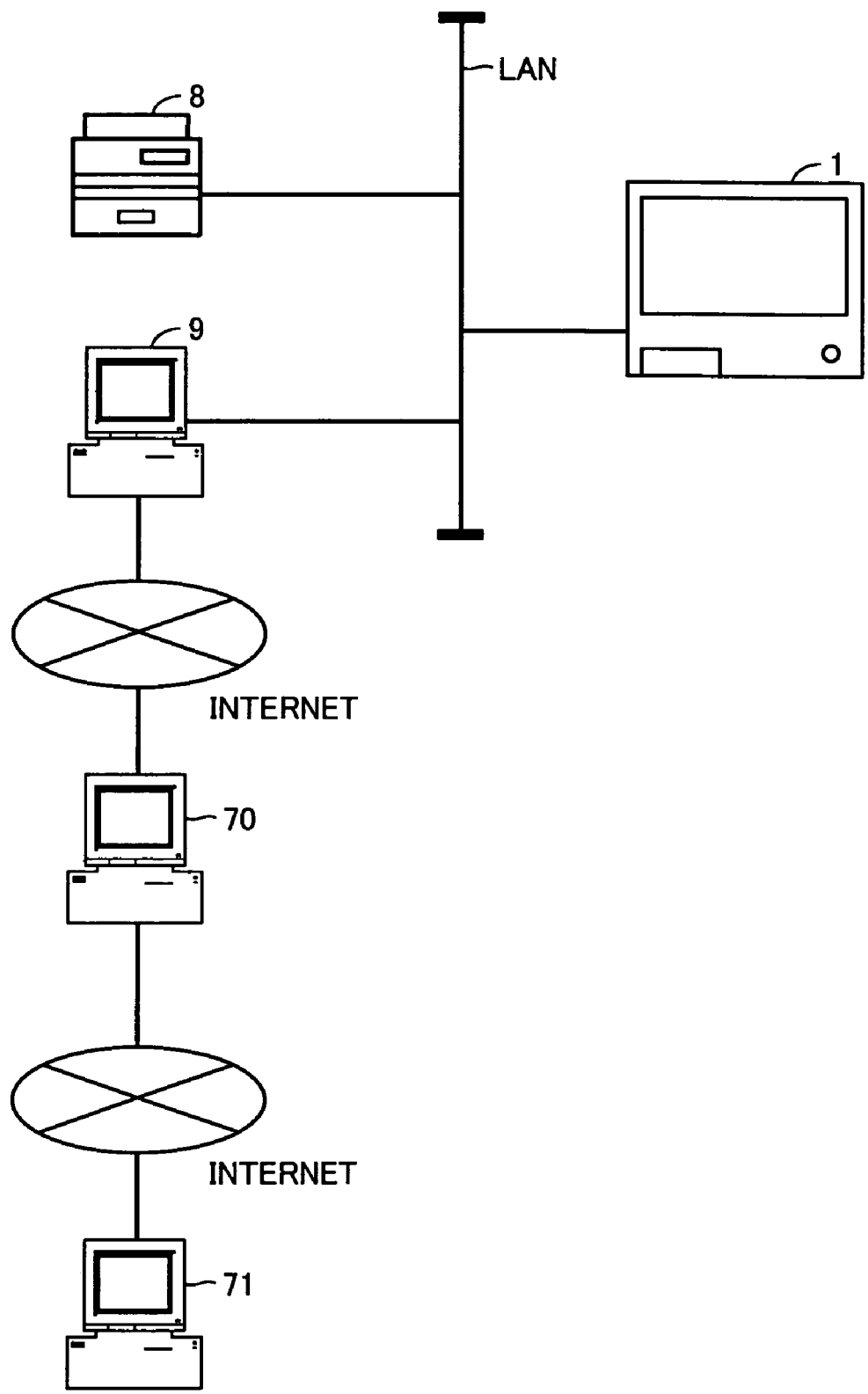
FIG. 1 is an illustration showing a concrete example of configuration of a printing system in an embodiment.

In FIG. 1, a printing system of the embodiment includes a data broadcasting receiving terminal 1 receiving a data broadcasting signal; and an image forming apparatus 8 such as a digital copying machine, a printer or the like printing print-out data on a paper sheet, and the constructional elements performs communication through a LAN (Local Area Network). Note that communication between data broadcasting receiving terminal 1 and image forming apparatus 8 may be communication on a dedicated line such as LAN or the like, communication on a public line such as a telephone line, or radio communication.

The data broadcasting signal is a signal including print-out data and a control signal associated with print-out controlling print-out or the like of the print-out data. In a case where a data broadcasting signal is a signal including moving picture data, print-out data and a control signal associated with print-out may be included in each frame of moving picture data as data different from the moving picture data. They may be included in a frame different from each frame included in moving picture data.

In the printing system, data broadcasting receiving terminal 1 detects print-out data and a control data associated with print-out from a received data broadcasting signal. Data broadcasting receiving terminal 1 notifies image forming apparatus 8 of the detected print-out data and the detected control signal associated with print-out.

When image forming apparatus 8 receives print-out data from data broadcasting receiving terminal 1, image forming apparatus 8 does not start print-out of print-out data. Image forming apparatus 8 waits for reception of a control signal associated with print-out notified from data broadcasting receiving terminal 1 separately from print-out data and in a case where information commanding printing start is included in a control signal associated with print-out received from data broadcasting receiving terminal 1, image forming apparatus 8 starts print-out of the received print-out data.

In a case where image forming apparatus 8 cannot print out because of paper-out or the like, image forming apparatus 8 is preferably designed so as not to start print-out automatically even after a state where paper sheets are supplemented and print-but is thereby enabled. The reason therefor is that if image forming apparatus 8 was designed so as to print out automatically after paper sheets are supplemented, a possibility would arise that printed out paper sheets are consumed wastefully in a case where broadcasting of a program has ended already.

Image forming apparatus 8 preferably has a power saving mode during which power consumption is suppressed. In a case where image forming apparatus 8 is in the power saving mode, the power saving mode is preferably cancelled in order to start print. Note that a configuration in the case will be described later.

In FIG. 1, the printing system further includes an information processing apparatus 9 connected to LAN. Information processing apparatus 9 is also connected to the Internet and acquires a broadcasting picture from an information processing apparatus 71 disclosing video information to the public through a relay apparatus 70 connected to the Internet. Print-out data is outputted to image forming apparatus 8 at a necessary timing during reproduction of a broadcasting image to thereby cause image forming apparatus 8 to perform print-out.

When image forming apparatus 8 receives print-out data from information processing apparatus 9, image forming apparatus 8 immediately starts printout. In a case where image forming apparatus 8 is in a state where print-out is disabled such as a paper-out condition or the like when receiving print-out data from image processing apparatus 9, image forming apparatus 8 is preferably designed to automatically start print-out after paper sheets supplemented without a new print command.

Then, detailed description will be given of apparatuses included in the printing system shown in FIG. 1.

(1-1) Data Broadcasting Receiving Terminal 1

Description will be given of a constitution of data broadcasting receiving terminal 1a and a flow of data in data broadcasting receiving terminal 1a in a case where data broadcasting receiving terminal 1 included in the printing system has an analog data broadcasting tuner using a block diagram shown in FIG. 2.

Figure 2:
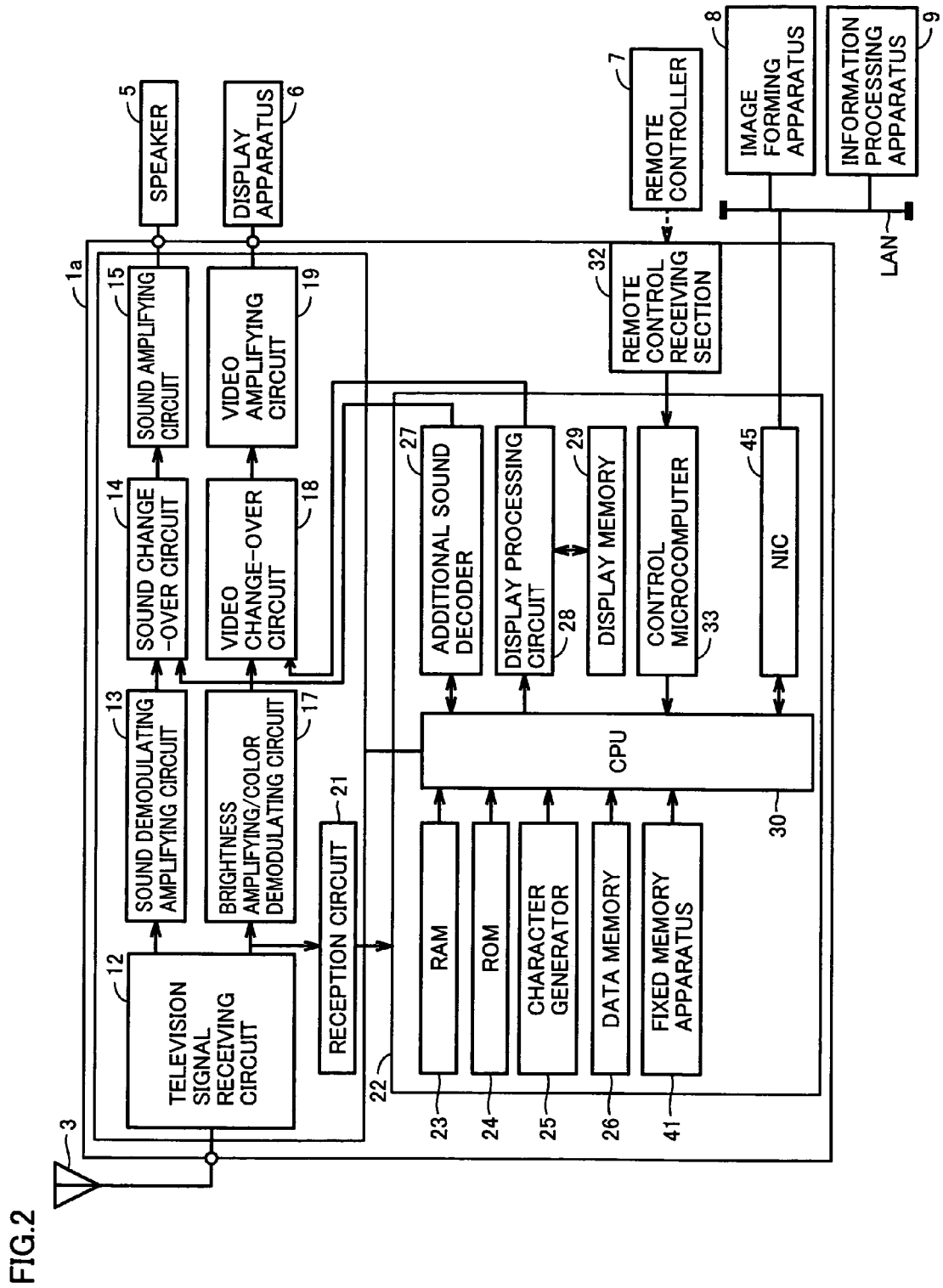
FIG. 2 is a block diagram showing a concrete example of configuration of a data broadcasting receiving terminal 1a having an analog data broadcasting tuner.

In FIG. 2, data broadcasting receiving terminal 1a receives a teletext signal from a broadcasting station not shown with an antenna 3. The teletext signal here is a television signal for a television program produced in a broadcasting station, to which coded teletext data is multiplexed in a vertical retrace line blanking interval. Antenna 3 supplies the received teletext signal to a television signal receiving circuit 12.

Television signal receiving circuit 12 selects a desired television signal from teletext data, which includes plural television signals received from antenna 3, the desired television signal is demodulated and separated into a sound signal and a composite video signal. Television signal receiving circuit 12 supplies the separated sound signal to a sound demodulating amplifying circuit 13 and a reception circuit 21 and the separated composite video signal is supplied to a brightness amplifying/color demodulating circuit 17 and reception circuit 21.

Brightness amplifying/color demodulating circuit 17 separates the composite video signal supplied from television signal receiving circuit 12 into a brightness signal and a color signal and supplies the signals to a video amplifying circuit 19 through a video change-over circuit 18.

Video amplifying circuit 19 amplifies the composite video signal, supplied from brightness amplifying/color demodulating circuit 17 through video change-over circuit 18, and separated into the brightness signal and the color signal, to a predetermined signal value. Video amplifying circuit 19 supplies the amplified composite video signal to a display apparatus 6 displaying a television screen image. Display apparatus 6 reproduces the amplified composite video signal supplied from video amplifying circuit 19.

Sound demodulating amplifying circuit 13 demodulates a frequency of the sound signal supplied from television signal receiving circuit 12 to supply the signal to sound amplifying circuit 15 through sound change-over circuit 14.

Sound amplifying circuit 15 amplifies the sound signal supplied from sound demodulating amplifying circuit 13 through sound change-over circuit 14 to a predetermined signal value. Sound amplifying circuit 15 supplies the amplified sound signal to a speaker 5. Speaker 5 reproduces the amplified sound signal supplied from sound amplifying circuit 15.

Reception circuit 21 separates and extracts a multiplexed letter signal from the composite video signal supplied from television signal receiving circuit 12. Reception circuit 21 supplies extracted coded data for each teletext data line to a decode processing circuit 22.

Decode processing section 22 includes a CPU (Central Processing Unit) 30 controlling all of decode processing section 22. Decode processing section 22 detects print-out data and a control data associated with print-out from coded data for each teletext data line supplied from reception circuit 21. Decode processing section 22 stores detected print-out data in a fixed memory apparatus 41.

CPU 30 included in decode processing section 22 decodes coded data for each teletext data line supplied to decode processing section 22 from reception circuit 21. That is, CPU 30 stores coded data for each teletext data line supplied to decode processing section 22 from reception circuit 21 in data memory 26. CPU 30 reads out a program for deciphering letter signal data stored in ROM (Read Only Memory) 24 onto RAM (Random Access Memory) 23 serving as a working area to execute the program and thereby converts teletext data stored in data memory 26 to teletext display data using characters such as letters and graphics stored in a character generator 25. CPU 30 stores converted teletext display data into a display memory 29 through a display processing circuit 28.

Display processing circuit 28 synthesizes teletext display data stored in display memory 29 to RGB signals (color signals in Red, Green and Blue) and supplies the RGB signals to video change-over circuit 18.

Reception circuit 21, in a case where the sound signal is supplied from television signal receiving circuit 12, supplies the sound signal to an additional sound decoder 27.

Additional sound decoder 27 converts the sound signal supplied from television signal receiving circuit 12 to an additional sound signal and supplies the converted signal to sound change-over circuit 14.

A remote controller 7 receives, from a user, an operating input of selection of a television broadcasting program and a change-over command changing over a sound and a picture image to be reproduced with speaker 5 or on display apparatus 6 to a sound and a picture different therefrom and sends a remote control signal corresponding the operating input to a remote control receiving section 32. Remote control receiving section 32 receives a remote control signal from a remote control 7 and supplies the received remote control signal to a control microcomputer 33.

Control microcomputer 33 produces control signals controlling operations and processing in various kinds of circuits from the remote control signal supplied from remote control receiving section 32. Control microcomputer 33 supplies the produced control signals to CPU 30.

CPU 30 controls all of decode processing section 22 with control signals supplied from control microcomputer 33. By controlling decode processing section 22 with CPU 30, in sound change-over circuit 14, for example, control is carried on change-over performed between a sound signal supplied from additional sound decoder 27 of decode processing section 22, a video signal of teletext program data supplied from sound demodulating amplifying circuit 13 and a video signal supplied from brightness amplifying/color demodulating circuit 17.

CPU 30 transmits print-out data stored in fixed memory apparatus 41 to image forming apparatus 8 from a NIC (Network Interface Card) 45 through LAN.

Note that while in FIG. 1, data broadcasting receiving terminal 1 and image forming apparatus 8 are shown as apparatuses independent from each other, a combination of data broadcasting receiving terminal 1 and image forming apparatus 8 is not limited to this configuration and may be an apparatus having both functions and constructed integrally in one piece thereof. As another example, description will be given of a configuration in a case where image forming apparatus 8 included in the system is image forming apparatus 100*a* having an analog data broadcasting tuner and of a data flow in image forming apparatus 100*a* using a block diagram shown in FIG. 3.

Figure 3:
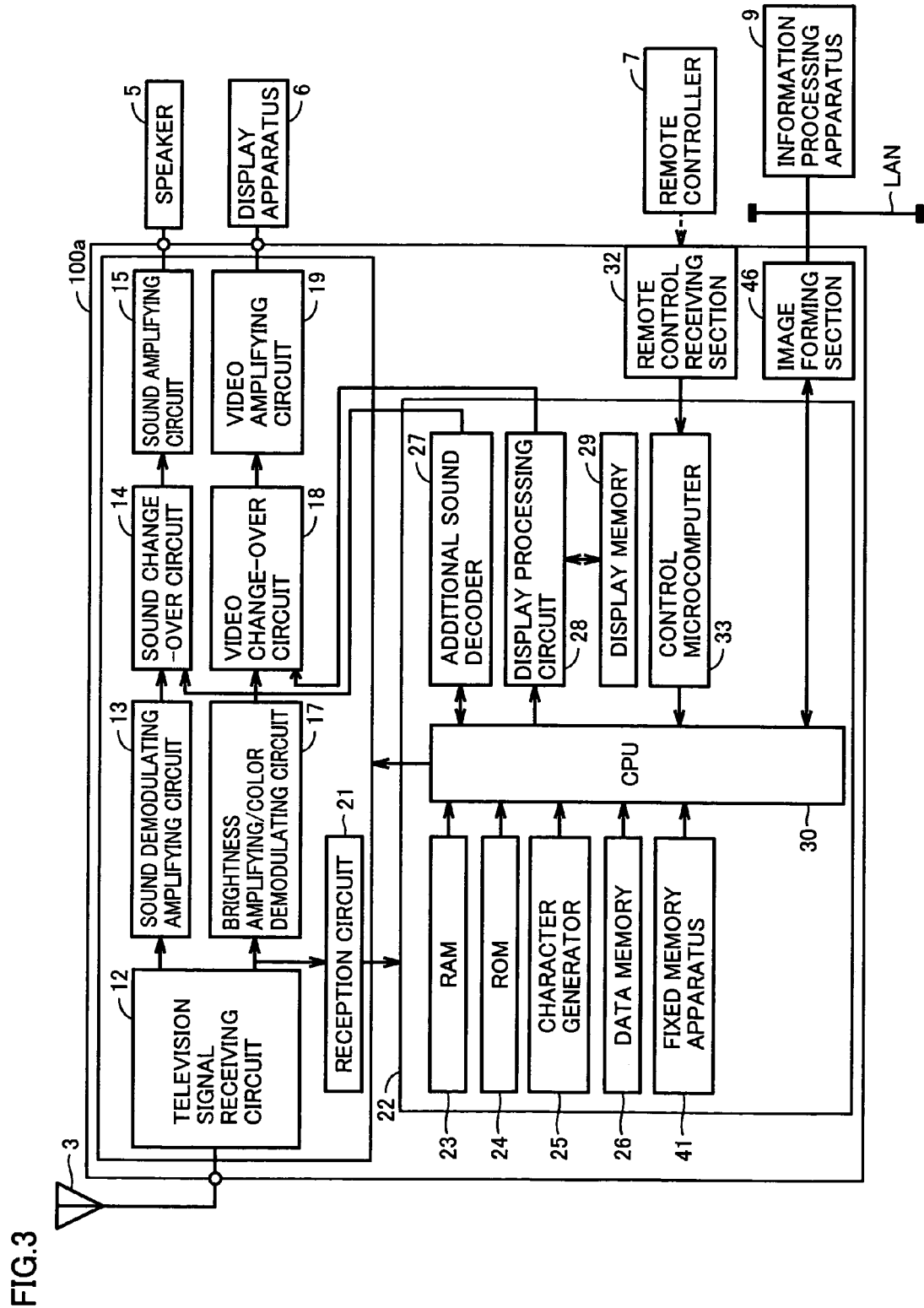
FIG. 3 is a block diagram showing a concrete example of configuration of an image forming apparatus 100a having an analog data broadcasting tuner.

In FIG. 3, image forming apparatus 100*a* further includes an image forming section 46 instead of NIC45 shown in FIG. 2. Image forming section 46 is connected to information processing apparatus 9 through LAN.

In image forming apparatus 100*a* similar to data broadcasting terminal 1*a* a concrete example of which configuration is shown in FIG. 2, CPU 30 included in decode processing section 22 detects print-out data and a control data associated with print-out from coded data for each teletext data line. CPU 30 supplies the detected print-out data and the detected control signal associated with print-out to image forming section 46. Image forming section 46 processes the print-out data and the control signal associated with print-out supplied from CPU 30. That is, image forming section 46, similar to image forming apparatus 8 described above, prints out the print-out data supplied from CPU 30.

Then, description will be given of a configuration of data broadcasting receiving terminal 1*b* in a case where a data broadcasting receiving terminal included in the printing system has a digital television broadcasting tuner using a block diagram shown in FIG. 4. Note that in the embodiment, description will be given of a case where a transmission source of a digital television signal is on a broadcasting satellite, which applies to a case where a ground wave is used or a case where a cable television is used in a similar manner.

Figure 4:
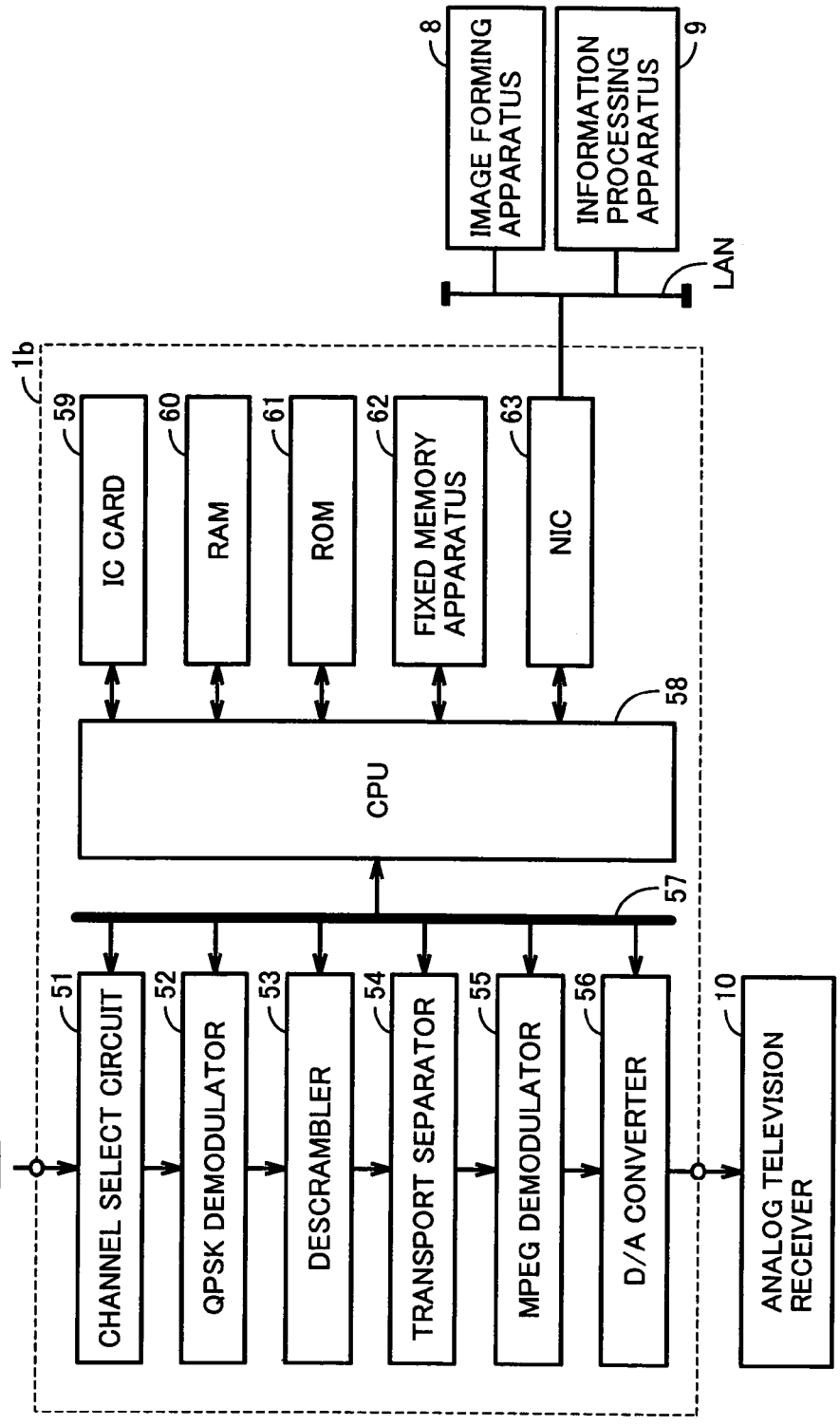
FIG. 4 is a block diagram showing a concrete example of configuration of a data broadcasting receiving terminal 1b having a digital television broadcasting tuner.

In FIG. 4, data broadcasting receiving terminal 1*b* is constituted of: a signal processing section including a channel select circuit 51 connected to a BS antenna 4, a QPSK (Quadrature Phase-Shift Keying: ¼ phase shift keying) demodulator 52, a descrambler 53, a transport separator 54, MPEG (Motion Picture Expert Group) demodulator 55 and a D/A (Digital-to-Analog) converter 56; and a control section including CPU 58, an IC card 59, a RAM 60, a ROM 61 and a fixed memory apparatus 62 via a bus 57 connected to the signal processing section.

Adopted in the digital television broadcasting system are a signal form and a system are adopted in conformity with DVB (Digital Video Broadcasting) standards. Therefore, the signal processing section of data broadcasting receiving terminal 1*b* receives a transmitted digital television signal with BS antenna 4 in conformity with DVB standards. BS antenna 4 converts the received digital television signal to an intermediate frequency and supplies the converted signal to channel select circuit 51.

Channel select circuit 51 converts the digital television signal supplied from BS antenna 4 based on a channel selected only by a computer of a viewer to a base band signal. Channel select circuit 51 supplies the converted base band signal to QPSK demodulator 52.

QPSK demodulator 52 demodulates the base band signal supplied from channel select circuit 51. QPSK demodulator 52 segments the demodulated digital data into packets and supplies the data as transport stream data to descrambler 53.

Descrambler 53, in a case where the transport stream data supplied from QPSK demodulator 52 is encoded, decodes the transport stream data and supplies it to transport separator 54. Descrambler 53, in a case where the transport stream data supplied from QPSK demodulator 52 is not encoded, supplies the transport stream data as is to transport separator 54.

Transport separator 54 separates the transport stream data supplied from descrambler 53 into a video data bit stream and a sound data bit stream of a transmitted program, and print-out data and a control data associated with print-out thereof according to a packet separating procedure. Transport separator 54 supplies the separated bit streams to MPEG demodulator 55.

MPEG demodulator 55 decodes the bit streams supplied from transport separator 54 according to the MPEG demodulating procedure. MPEG demodulator 55 supplies the decoded MPEG decode signal to D/A converter 56.

D/A converter 56 converts the MPEG decode signal supplied from MPEG demodulator 55 in the digital form to an analog signal. D/A converter 56 supplies the converted analog signal to, for example, an analog television receiver 10. Thereby, in analog television receiver 10, the analog signal is outputted through reproduction and display.

Transport separator 54 stores the separated print-out data and control signal associated with print-out into RAM 60 or fixed memory apparatus 62.

CPU 58 of the control section performs various kinds of control and signal processing so that the signal processing units can work efficiently according a loaded realtime OS and a system program stored in ROM 61 through bus 57.

That is, CPU 58, in a case where a program received by BS antenna 4 and selected in channel select circuit 51 is transmitted in the encoded state, reads out current viewer contract information stored in IC card 59 to decipher the information by controlling descrambler 53.

Stored in ROM 61 is a system program corresponding to a broadcasting satellite on which a user is under use contract. CPU 58 supplies a program load signal for reading out the system program to ROM 61 and reads out the system program stored in ROM 61 onto RAM 60. CPU 58 executes the system program read out onto RAM 60 to control channel select circuit 51, QPSK demodulator 52, transport separator 54, MPEG demodulator 55 and D/A converter 56 in the signal processing section.

CPU 58 transmits print data stored in RAM 60 or fixed memory apparatus 62 to image forming apparatus 8 from NIC 63 through LAN.

Note that while in FIG. 1, data broadcasting receiving terminal 1 and image forming apparatus 8 are shown as apparatuses independent of each other, a configuration thereof is not specifically limited to this and may be integrated into a single apparatus with both functions. As another example, description will be given of a configuration in a case where image forming apparatus 8 included in the printing system is image forming apparatus 100b having a digital television broadcasting tuner using a block diagram shown in FIG. 5.

Figure 5:
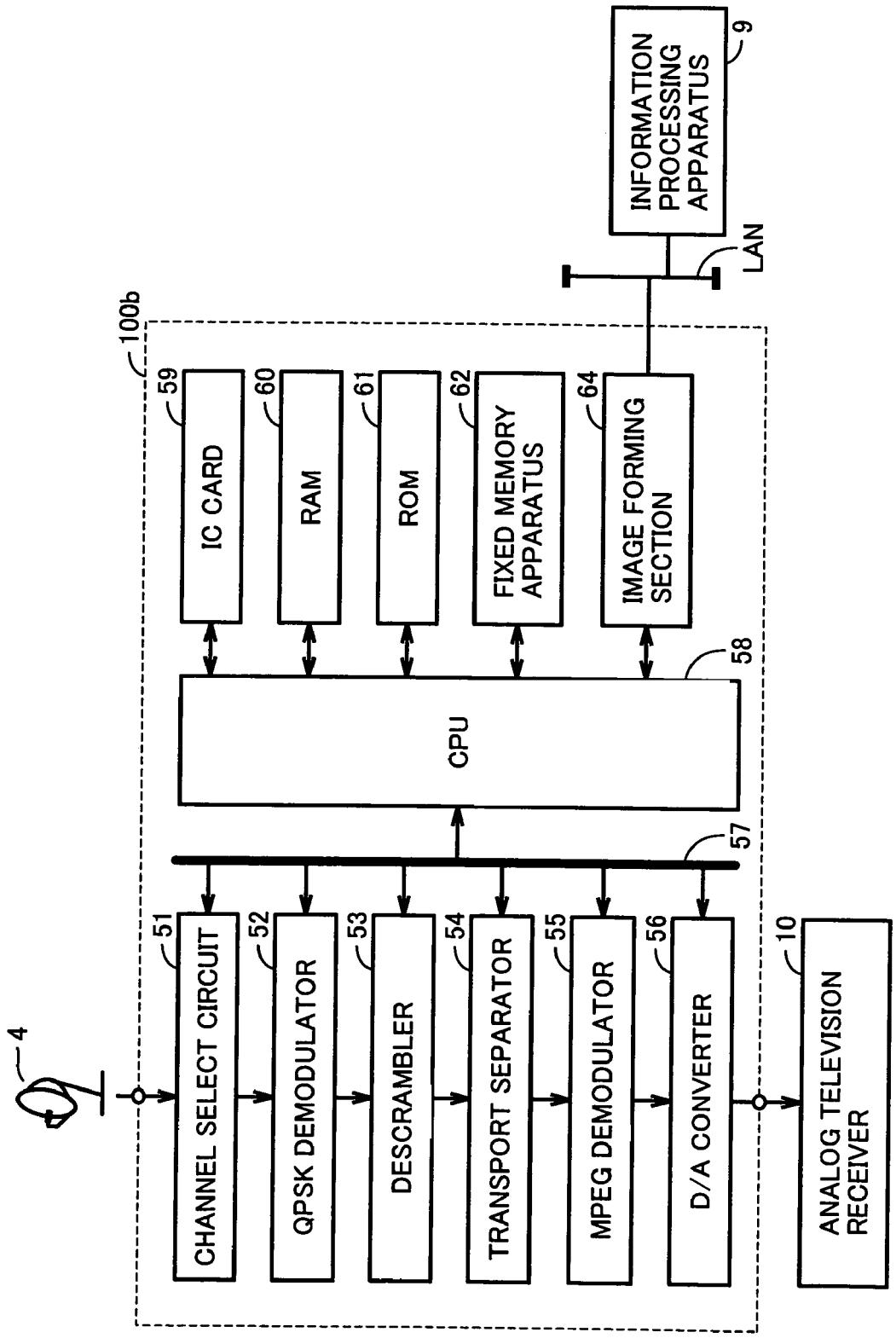
FIG. 5 is a block diagram showing a concrete example of configuration of an image forming apparatus 100b having a digital television broadcasting tuner.

In FIG. 5, image forming apparatus 100b further includes an image forming section 64 instead of NIC 63 shown in FIG. 4. Image forming section 64 is connected to an information processing apparatus 9 through LAN.

In image forming apparatus 100b, similar to data broadcasting terminal 1b, the concrete example of configuration of which is shown in FIG. 4, transport separator 54 separates a video data bit stream, a sound data bit stream of a transmitted program, and print-out data and a control signal associated with print-out thereof from transport stream data supplied from descrambler 53 according to a packet separating procedure. Transport separator 54 supplies the separated print-out data and separated control signal associated with print-out to image forming section 64. Image forming section 64 processes the print-out data and the control signal associated with print-out supplied from transport separator 54. That is, image forming section 64, similar to image forming apparatus 8, prints out the print-out data supplied from transport separator 54.

(1-2) Image Forming Apparatus 8

Description will be given of image forming apparatus 8 included in the printing system. Note that while, as shown in FIG. 1, image forming apparatus 8 here will be described as a separate apparatus independent of data broadcasting receiving apparatus 1, image forming section 46 shown in FIG. 3 and image forming section 64 shown in FIG. 5 are both of the same circuit configuration as image forming apparatus 8.

Figure 6:
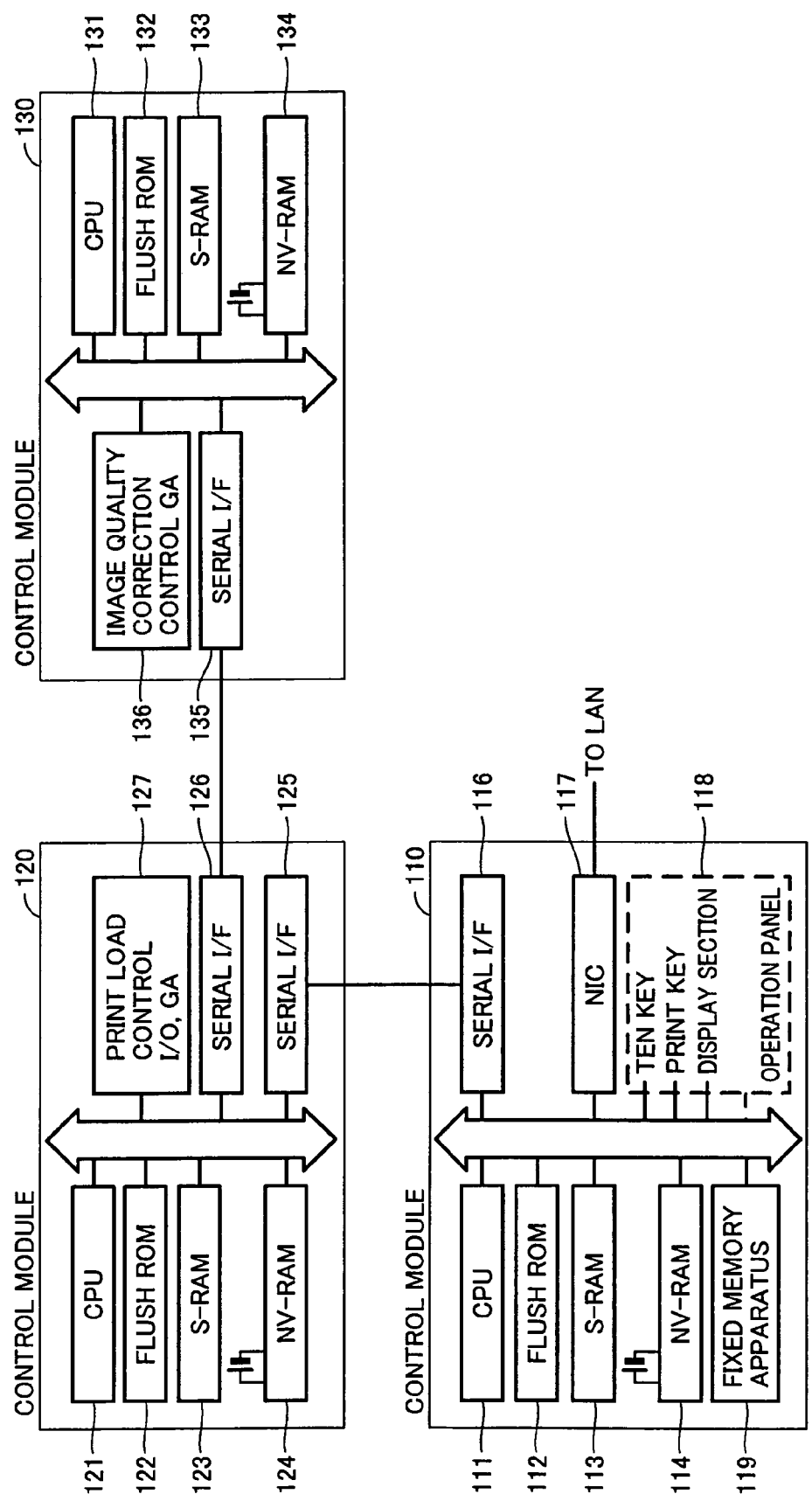
FIG. 6 is a block diagram showing a concrete example of circuit configuration of an image forming apparatus 8.

In FIG. 6, image forming apparatus 8 is an apparatus of a multi-CPU architecture processing a manuscript picture to form a copy picture on a paper sheet and includes three control modules 110 to 130 corresponding to respective CPUs.

Control module 110 includes: a CPU 111 performing overall control of image forming apparatus 8; a rewritable Flush ROM 112 storing a firmware executed in CPU 111; a S-RAM (Static RAM) 113 serving as a working area when the firmware runs in CPU 111; a battery backed up NV-RAM (Nonvolatile RAM) 114 holding various kinds of setting values; a serial I/F (interface) 116 transmitting/receiving various kinds of control data to or from control module 120; an NIC 117 transmitting/receiving various kinds of data through LAN; an operating panel 118 on which a user performs various kinds of operations and settings; and a fixed memory apparatus 119 storing print data received through LAN.

Control module 120 includes: a CPU 121 controlling print processing of image forming apparatus 8; a rewritable Flush ROM 122 storing a firmware executed in CPU 121; a S-RAM 123 serving as a working area when the firmware runs in CPU 121; a battery backed up NV-RAM 124 holding various kinds of setting values; a serial I/F 125 transmitting/receiving various kinds of control data to or from control module 110; a serial I/F 126 transmitting/receiving various kinds of control data to or from control module 130; a print load control I/O (Input-Output), GA (Graphics Accelerator) 127 controlling a load on image forming processing. Control module 120 further performs control in the power saving mode described above.

Control module 130 includes: a CPU 131 controlling correction of a image quality in image forming apparatus 8; a rewritable Flush ROM 132 storing a firmware executed by CPU 131; a S-RAM 133 serving as a working area when the firmware runs in CPU 131; a battery backed up NV-RAM 134 holding various kinds of setting values; a serial I/F 135 transmitting/receiving various kinds of control data to or from control module 120; and an image quality correction control GA 136.

(1-3) Data Broadcasting Signal

Then, description will be given, using FIG. 7, of a concrete example of configuration of a data broadcasting signal produced on the broadcasting station side and transmitted to data broadcasting receiving terminal 1a and data broadcasting receiving terminal 1b, or image forming apparatus 100a and image forming apparatus 100b capable of receiving a data broadcasting signal. Description will be further given simultaneously of information produced on the broadcasting station, and a data transmission method to data broadcasting receiving terminal 1 from the broadcasting station side.

The broadcasting station side transmits a broadcasting image including a sound and a moving picture. In this transmission, the broadcasting station also produces private data as information different from each frame of the moving picture in correspondence with each frame of the moving picture. The produced private data is, as shown in FIG. 7, added to image data corresponding to each frame included in the moving picture and transmitted to data broadcasting receiving terminal 1. This processing is performed in an information processing apparatus on the broadcasting station side not shown and since the information processing apparatus is made of a general purpose personal computer and others, no description is given of a configuration thereof here. Note that the private data means data including a control signal associated with print-out controlling print-out or the like, and print-out data of the present invention.

Figure 7:
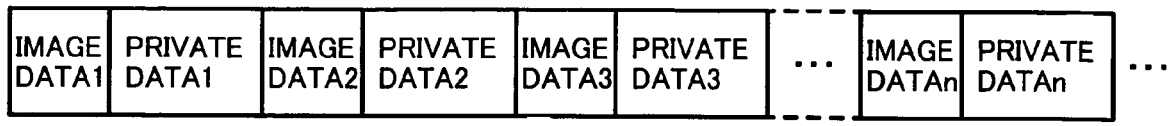
FIG. 7 is a representation showing a concrete example of structure of a data broadcasting signal.

When a program starts, as shown in FIG. 7, the information processing apparatus on the broadcasting station side sequentially transmits a pair of image data 1 and private data 1, a pair of image data 2 and private data 2, a pair of image data 3 and private data 3, . . . , and a pair of image data n and private data n till the end of the program.

Control signals included in private data and associated with print-out includes: the start of print-out, inhibition of print-out, a time from when one frame of a moving picture corresponding to a control signal associated with the print-out is reproduced till print-out starts; an erasure command for print-out data, and printing conditions showing single side printing or double side printing, a printing magnification and the presence or absence of a binding margin. The broadcasting station side sets timings necessary for respective information pieces in private data.

To be more detailed, "private data 1" paired with "image data 1", which is the first frame of a moving picture presented on display apparatus 6 at the start of a program includes print-out data and a control signal associated with print-out, and the control signal associated with print-out here corresponds to printing prohibition data meaning prohibition of print-out.

Data broadcasting receiving terminal 1, when receiving private data 1 including the control signal associated with print-out from the broadcasting station side, that is, when receiving a control signal associated with print-out, which is printing prohibition data prohibiting the start of print-out from the broadcasting station side, transmits not only print-out data included in "private data 1", but also a control data associated with print-out, which is printing prohibition data, to image forming apparatus 8.

Note that, as another method, there is also available a method of transmitting only print-out data as "private data 1" from the broadcasting station side. In this case, data broadcasting receiving terminal 1 transmits print-out data included in "private data 1" received from the broadcasting station side to image forming apparatus 8. Image forming apparatus 8 is preferably configured so as to have a measure not to immediately start print-out if the data is only print-out data, when receiving data from data broadcasting receiving terminal 1.

In this case, if a control signal associated with print-out included in "private data 1" is printing start data permitting the start of print-out, data broadcasting receiving terminal 1 transmits a printing start signal, which is a control signal associated with print-out included in "private data 1" to image forming apparatus 8. In this case, image forming apparatus 8 starts print-out immediately after a program starts. With such workings, it is possible to facilitate how to cook to be understood by printing out a recipe in a cooking program in advance or to have a more fun from a program by introducing characters in a movie program in advance together with illustrations.

In such a way, the information processing apparatus on the broadcasting station side incorporates a control signal associated with print-out, which is a printing start data permitting the start of print-out, into private data n corresponding to image data n showing one frame in a moving picture, which is a scene to be printed out in a progress of the program in screening.

Data broadcasting receiving terminal 1, when receiving private data n including the control signal associated with print-output from the broadcasting station side, that is when receiving the control signal associated with print-out, which is printing start data permitting the start of print-output from the broadcasting station side, transmits not only print-out data included in "private data n", but also a printing start signal to image forming apparatus 8 since the control signal associated with the print-out indicates that when image data n is received is a timing at which print-out starts.

Such control on print-out is effectively used in a case where a small test is printed out for confirmation of a degree of understanding of contents having been described in an educational program or in a case where a go problem or a chess problem is issued and a problem image is printed out in the go or chess program.

Another method is also exemplified as a method for the broadcasting station side to notify data broadcasting receiving terminal 1 of a timing of the start of print-out. That is, a method is also exemplified in which there is prepared a time difference data from a predetermined timing prior to a timing of the start of the print-out of a program to a timing of the start of print-out, and the time difference data is transmitted to data broadcasting receiving terminal 1 by a timing at which print image data, the print-out of which is to start, is transmitted. To be concrete, the broadcasting station side sets the time difference data in "private data 1" in the first frame with which broadcasting starts. Notification of a timing of the start of print-out can furthermore be realized by setting printing start data starting print-out in "private data m" corresponding to a scene broadcast at a predetermined timing prior to a timing of the start of print-out.

Data broadcasting receiving terminal 1 having received the time difference data included in "private data 1" transmits a printing start signal to image forming apparatus 8 at a timing later than a timing at which one frame of image data received together with "private data m" is broadcast by the time difference. Thereby, print-out at a necessary timing is possible even if a delay or alteration in broadcasting time occurs.

Note that it is preferable to incorporate end data indicating the end of a program into a private data corresponding to image data indicating the end of a program. By receiving the private data, data broadcasting receiving terminal 1 can make a discrimination that the program in consideration has ended.

A similar configuration can also be used in a case where a program, which is digital information, is transmitted using the Internet. In the present invention, an IP address is inputted into information processing apparatus 9 to download a program thereinto and the downloaded program can be executed therein.

Information processing apparatus 9, if starts execution of the downloaded program, receives digital information including print-out data through the Internet. Information processing apparatus 9 separates video information that can be reproduced as a moving picture and print-out data from the received digital information and stores the separated print-out data into a memory apparatus such as a hard disk or the like not shown of information processing apparatus 9. Thereafter, the separated video information is reproduced as a moving picture and the information processing apparatus 9 issues a command for printing out the print-out data onto a paper sheet to image forming apparatus 8 connected through LAN at a necessary timing.

Note that information processing apparatus 9 acquires video information from information processing apparatus 71 through relay apparatus 70 connected to the Internet. In this step, relay apparatus 70 adds print-out data and a control signal associated with print-out to video information acquired from information processing apparatus 71. Relay apparatus 70 transmits video information added with the print-out data and the control data associated with print-out to information process apparatus 9.

Generally, in transmission of a program, which is digital information, through the Internet, a case arises where one program, if being large in data capacity, is divided into plural files and transmitted. In this case, end data is included in one file presenting the last image of a program. Image forming apparatus 8 receives the end data and thereby can erase print-out data stored in fixed memory apparatus 119 in a case where print-out is disabled for a cause such as paper-out in a predetermined timing in the course of a program in screening.

Note that information processing apparatus 9, which is another apparatus included in the printing system, is an apparatus constructed of a general purpose personal computer and others, a configuration of which is not limited in the present invention. Therefore, no description will be given of a configuration thereof.

(1-4) Sequence between Data Broadcasting Receiving Terminal 1 and Image Forming Apparatus 8

Figure 8:
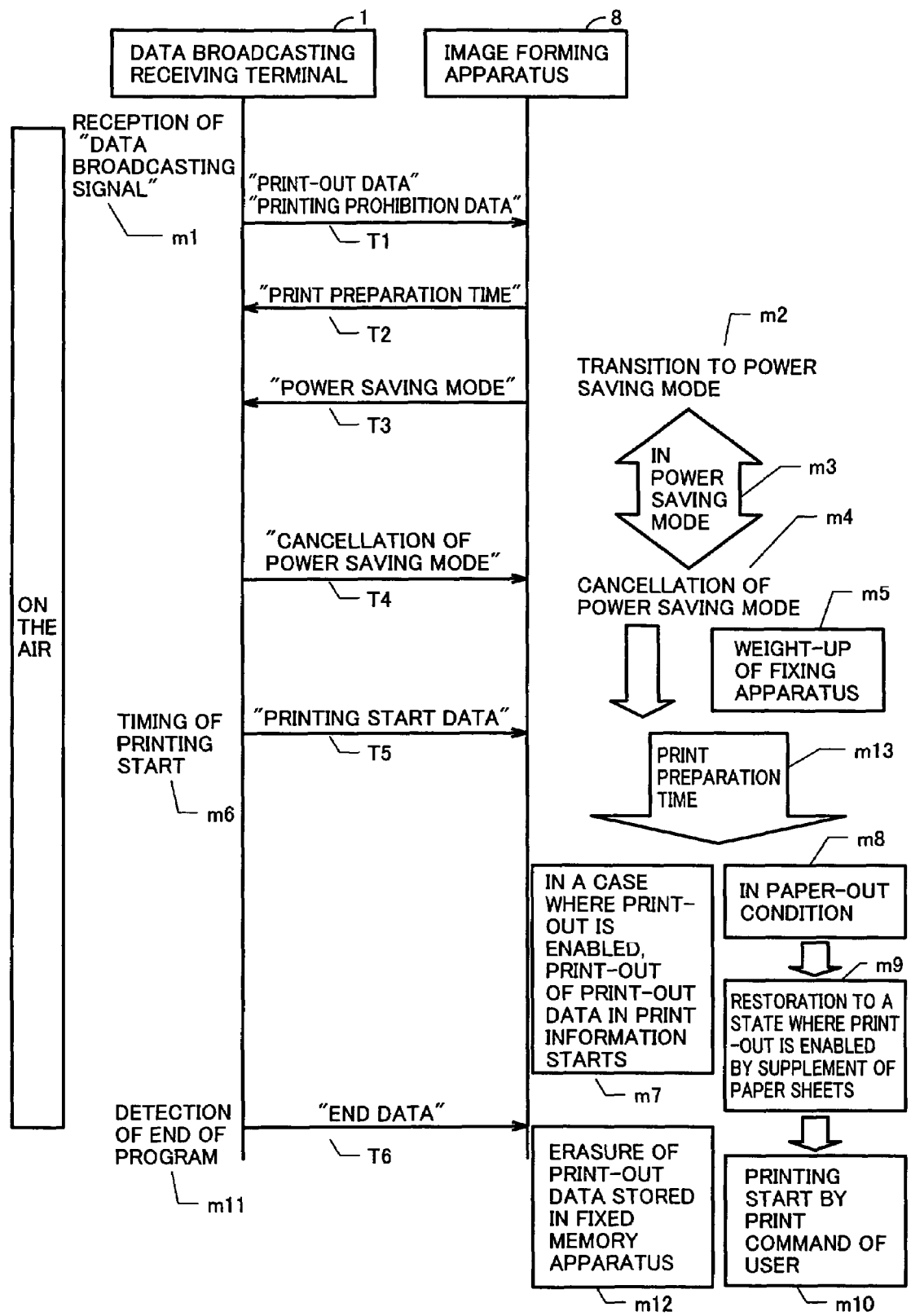
FIG. 8 is a representation showing a sequence between the data broadcasting receiving terminal 1 and the image forming apparatus 8 included in the printing system.

Then, description will be given of a sequence between data broadcasting receiving terminal 1 and image forming apparatus 8 included in the printing system using FIG. 8. In FIG. 8, T indicates a timing of communication and m indicates a timing of event occurrence.

In FIG. 8, broadcasting of a broadcasting program is transmitted to data broadcasting receiving terminal 1 by a data broadcasting signal from the broadcasting station side not shown. A structure of a data broadcasting signal is shown in FIG. 7 and print-out data and a control signal associated with print-out are included in the private data.

If broadcasting of a program starts, data broadcasting receiving terminal 1 receives a data broadcasting signal from the broadcasting station side not shown (m1).

Data broadcasting receiving terminal 1 detects print-out data and a control signal associated with print-out from private data included in the data broadcasting signal received in m1. A control signal associated with print-out at this time point includes a time data indicating a time difference between a timing at which image data corresponding to private data of the data broadcasting signal is broadcast and a timing at which extracted print-out data is printed out; and a printing prohibition data meaning printing prohibition. Data broadcasting receiving terminal 1 not only extracts time data from the private data that data broadcasting receiving terminal 1 has received, but also detects print-out data. Data broadcasting receiving terminal 1 notifies image forming apparatus 8 of the detected print-out data and the printing prohibition data (T1).

Image forming apparatus 8, if having received the print-out data and the printing prohibition data transmitted from data broadcasting receiving terminal 1 at T1, stores the print-out data that the apparatus 8 has received into fixed memory apparatus 119. Image forming apparatus 8 notifies data broadcasting receiving terminal 1 of a time necessary for converting the print-out data that image forming apparatus 8 has received to a format that can be printed out, that is, a time from when image forming apparatus 8 receives notification of printing start data till print-out can start, as a print preparation time (T2). Note that at a stage where image forming apparatus 8 receives a signal from data broadcasting receiving terminal 1 at T1, image forming apparatus 8 does not start print-out since the signal that image forming apparatus 8 having received is printing prohibition data.

Then, if data broadcasting receiving terminal 1 detects that a control signal associated with print-out that data broadcasting receiving terminal 1 has received from the broadcasting station side is printing start data, which is a signal notifying a timing of printing start (m6), data broadcasting receiving terminal 1 transmits printing start data at a timing earlier by a print preparation time that data broadcasting receiving terminal 1 has received at T2 to image forming apparatus 8 (T5).

Image forming apparatus 8 having received printing start data from data broadcasting receiving terminal 1 at T5, in a case where print-out is enabled, prints out print-out data stored in fixed memory apparatus 119 (m7) after a print preparation time elapses (m13).

On the other hand, image forming apparatus 8, in a case where print-out is disabled, to be concrete in a case where the apparatus 8 in a paper-out condition (m8), is restored to a state where print-out is enabled if a user supplements paper sheets (m9), whereas image forming apparatus 8 automatically does not start print-out. Image forming apparatus 8, if a user turns on a print key of an operating panel 118 and inputs a print command, prints out print-out data stored in fixed memory apparatus 119 (m10).

Description will be further given of a case where image forming apparatus 8 is in the power saving mode (m3). In a case where image forming apparatus 8 transitions to the power saving mode in which power consumption is suppressed low (m2) after image forming apparatus 8 receives print-out data and printing prohibition data from data broadcasting receiving terminal 1 at T1 before image forming apparatus 8 receives printing start data at T5, image forming apparatus 8 notifies data broadcasting receiving terminal 1 of having transitioned to the power saving mode (T3). The notification at T3 includes two pieces of information on a transition notification to the power saving mode and time data required for restoration from the power saving mode.

Data broadcasting receiving terminal 1 determines a timing of print-out from time data showing a time difference that data broadcasting receiving terminal 1 has received from the broadcasting station side in m1 and time data necessary for restoration from the power saving mode that data broadcasting receiving terminal 1 receives from image forming apparatus 8 at T3. Data broadcasting receiving terminal 1 issues a command of power saving mode cancellation so as to cancel the power saving mode at an earlier timing (T4). Power saving mode cancellation, for which data broadcasting receiving terminal 1 at T4 issues a command to image forming apparatus 8 is preferably issued at a timing earlier by a time necessary for restoration from the power saving mode and a print preparation time combined in addition of the time data indicating a time difference.

In such a way, by issuing a command of power saving mode cancellation at T4 so that image forming apparatus 8 can restore from the power saving mode after data broadcasting receiving terminal 1 receives a notification from image forming apparatus 8 of having transitioned to the power saving mode at T3 before transmitting printing start data at T5, the start of print-out can be realized in image forming apparatus 8 at timing of the start of print-out.

Image forming apparatus 8, if receiving printing start data from data broadcasting receiving terminal 1 at T4, cancels the power saving mode (m4), executes warm-up of a fixing apparatus (m5) and starts print-out (m7) when a state where print-out is enabled is established after a print preparation time elapses (m13). Note that in the operation, image forming apparatus 8 may receive data including print-out data from data broadcasting receiving terminal 1 instead of a command of power saving mode cancellation at T4. In the case, it is preferable that image forming apparatus 8 detects print-out data and thereby cancels the power saving mode (m4), executes warm-up of the fixing apparatus (m5) and starts print-out (m7) when a state where print-out is enabled is established after a print preparation time elapses (m13).

Description will be given below of a method of erasing print data that image forming apparatus 8 receives at T1 in a case where paper jam, paper-out or other troubles occur at a timing at which image forming apparatus 8 receives printing start data from data broadcasting receiving terminal 1 at T5 or in a case where print-out is disabled because of power off due to flash to ground in data broadcasting receiving terminal 1, a malfunction due to a program or the like.

Data broadcasting receiving terminal 1, when detecting the end of a program (m11), notifies image forming apparatus 8 of end data (T6).

image forming apparatus 8 having received end data from data broadcasting receiving terminal 1 at T6 erases print-out data stored in fixed memory apparatus 119 (m12). Thereby, image forming apparatus 8 does not execute unnecessary print-out and at the same time, enables a capacity of fixed memory apparatus 119 to be effectively used.

Note that a method can also be conceived of taking a measure by receiving a control signal associated with print-output including data for erasing print data from the broadcasting station side instead of image forming apparatus 8 erasing print data stored in fixed memory apparatus 119 in m12 after data broadcasting receiving terminal 1 detects the end of a program in m11. That is, a method is also exemplified in which data broadcasting receiving terminal 1 notifies image forming apparatus 8 of erasure of print-out data at a timing of reception of a control signal associated with print-out including data for erasing print data from the broadcasting station side. For example, it is conceived that erasure of print-out data is detected at a time point at which the answers of the small test are broadcast, though not at the end of a program, image forming apparatus 8 is caused to erase data on a reply paper sheet for the small test, which is print-out data.

In a case where image forming apparatus 8 is image forming apparatus 100*a* having an analog data broadcasting tuner or image forming apparatus 100*b* having a digital television broadcasting tuner, any of communications at T1 to T6 does not occur, but events m1 to m13 arises, and processing similar to those described above is performed.

That is, image forming apparatus 100*a* or 100*b* detects print-out data and a control signal associated with print-out from private data of a data broadcasting signal that image forming apparatus 100*a* or 100*b* has received. The control signal associated with print-out at this time point indicates a time data indicating a time difference between a timing at which image data corresponding to private data of a data broadcasting signal is displayed and a timing at which extracted print-out data is printed out and a printing prohibition data meaning printing prohibition. In a case where image forming apparatus 100*a* or 100*b*, thereafter, transitions to the power saving mode, image forming apparatus 100*a* or 100*b* performs restoration from the power saving mode in consideration of the time data indicating the time difference, a time to restore from the power saving mode and a time required for converting print data to a format that can be printed out.

If image forming apparatus 100*a* or 100*b* detects that a control. signal associated with print-out that image forming apparatus 100*a* or 100*b* has received is of a printing start timing (m6), image forming apparatus 100*a* or 100*b* performs processing of m7 to m10 and prints out print-out data. Image forming apparatus 100*a* or 100*b*, when detecting the end of a program (m11), performs erasure of print-out data in m12.

(2) Processing in Data Broadcasting Receiving Terminal 1

Then, description will be given of processing in the printing system.

Description will be given, first of all, of processing in a case where data broadcasting receiving terminal 1 in the printing system is data broadcasting receiving terminal 1*a*, that is, in a case where data broadcasting receiving terminal 1 in the printing system is data broadcasting receiving terminal 1*a* receiving analog broadcasting, using a flowchart of FIG. 9. The processing shown in FIG. 9 is realized by spreading a program stored in ROM 24 onto RAM 23 to execute the program.

Figure 9:
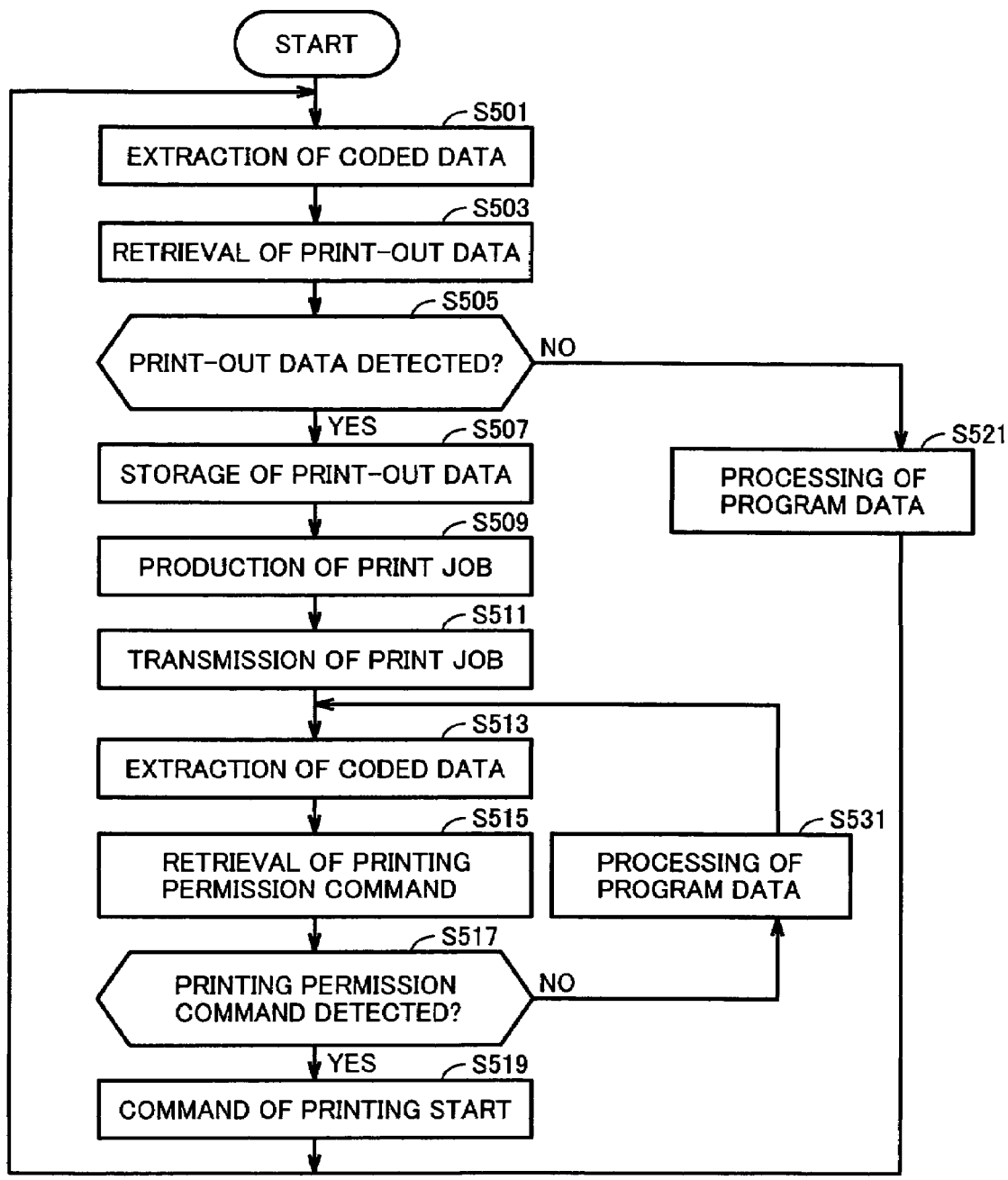

In FIG. 9, data broadcasting receiving terminal 1*a*, in step S501, extracts coded data for each teletext data line that the terminal 1*a* has received. Then, data broadcasting receiving terminal 1*a*, in step S503, retrieves print-out data to be printed out from the coded data.

Various methods are exemplified as retrieval methods for print-out data in S503 and no particular method is specifically limited in the present invention. To be concrete, in data that data broadcasting receiving terminal 1*a* receives as a data broadcasting signal, print-out data is placed between a tag <Print> and a tag </Print> as shown below.

<Print>
print-out data
...
...
</Print>

Therefore, print-out data, in step S503, can be retrieved by determining whether or not the data placed between the tag <Print> and the tag </Print> is included in the coded data. Note that an identification method for print-out data in the present invention is not specifically limited to the method described above and any of other methods may be used for the identification.

In a case where, as a result of the retrieval in step S503, no print-out data is included in coded data for each teletext data line (NO in step S505), data broadcasting receiving terminal 1*a*, in step S521, processes the coded data as a program data in a common letter program. Then, the process returns to processing in step S501 to extract coded data of the next teletext data.

On the other hand, in a case where, as a result of the retrieval in step S503, print-out data is included in coded data for each teletext data line (YES in step S505), data broadcasting receiving terminal 1*a*, in step S507, stores the detected print-out data into fixed memory apparatus 41.

Then, data broadcasting receiving terminal 1*a*, in step S509, produces print-out data, which is a print job, based on print-out data stored in fixed memory apparatus 41 and, in step S511, sends out the produced print-out data, which is a print job, to image forming apparatus 8 through LAN. At this time, a command is given to image forming apparatus 8 so as not to process the sent out print data. That is, data broadcasting receiving terminal 1a, in step S511, transmits a signal commanding so as not to process the print job together with the print-out data.

Thereafter, data broadcasting receiving terminal 1a, in step S513, further extracts coded data for each teletext data line and, in step S515, retrieves a control signal associated with print-out from the coded data.

In a case where, as a result of the retrieval in step S515, no control signal associated with print-out is included in coded data for each teletext data line (NO in step S517), data broadcasting receiving terminal 1a, in step S531, processes the coded data as a program data of a common letter program. Then, the process returns to processing in step S513 to extract coded data of the next teletext data.

On the other hand, in a case where, as a result of the retrieval in step S515, a control signal associated with print-out is included in coded data for each teletext data line (YES in step S517), data broadcasting receiving terminal 1a, in step S519, issues a command of a control signal associated with print-out to image forming apparatus 8 based on the control signal associated with detected print-out. Note that in FIG. 8, there are shown concrete contents and a timing of a command for the control signal associated with print-out here.

Thereafter, data broadcasting receiving terminal 1a returns to processing in step S501 and executes the above processing repeatedly till the power supply thereof is turned off.

By performing the above processing in data broadcasting receiving terminal 1a, in the printing system, it is possible that data broadcasting receiving terminal 1a produces print-out data, which is a print job, from data separated and extracted from a data broadcasting signal multiplexed in a vertical retrace line blanking interval of a television broadcasting signal to send out the print-out data to image forming apparatus 8 and thereafter, prohibit printing of the print-out data in image forming apparatus 8 till image forming apparatus 8 receives a control signal associated with print-out, which is printing start data.

Description will be given of processing in a case where data broadcasting receiving terminal 1 in the printing system is data broadcasting receiving terminal 1b, that is, a case where data broadcasting receiving terminal 1 in the printing system is data broadcasting receiving terminal 1b receiving digital television broadcasting. Performed in data broadcasting receiving terminal 1b is a processing almost similar to processing in data broadcasting receiving terminal 1a shown in the flowchart of FIG. 9. The processing at this time is realized by an operation that CPU 58 of data broadcasting receiving terminal 1b spreads a program stored in ROM 61 onto RAM 60 to execute the program.

That is, a signal form and a system in conformity with DVB standards are adopted as described above in a digital television broadcasting system. In this case, in data broadcasting receiving terminal 1b, it is discriminated whether or not print-out data and a control data associated with print-out are included in transport stream data. Processing thereafter is similar to the processing in data broadcasting receiving terminal 1a shown in FIG. 9.

To be more concrete, in DVB standards, service information data of a program is transmitted in addition to MPEG compressed image and sound data. The service information data includes, for example, program detail information such as a program number, a program title, start date and time of a program, a time length of the program, a current time, a program story, players of the program and the like, which are time division transmitted in bitstreams.

Data broadcasting receiving terminal 1b, in step S503, extracts print-out data from coded data of the service information data and, in step S515, extracts a control signal associated with print-out from the coded data of the service information data.

By performing the above processing in data broadcasting receiving terminal 1b, it is possible that data broadcasting receiving terminal 1b in the printing system produces print-out data, which is a print job, from data extracted from service information data included in a television broadcasting signal to send out the produced print-out data to image forming apparatus 8 and thereafter, prohibits image forming apparatus 8 to print the print job till image forming apparatus 8 receives a control signal associated with print-out, which is printing start data.

(3) Processing in Image Forming Apparatus 8

Then, description will be given of processing in image forming apparatus 8 included in the printing system using a flowchart of FIG. 10. The processing shown in the flowchart of FIG. 10 is realized by operations that CPUs 111, 121 and 131 of control modules 110, 120 and 130 spread firmwares stored in Flush ROMs 112, 122 and 132 onto S-RAMs 113, 123 and 133, respectively.

Figure 10:
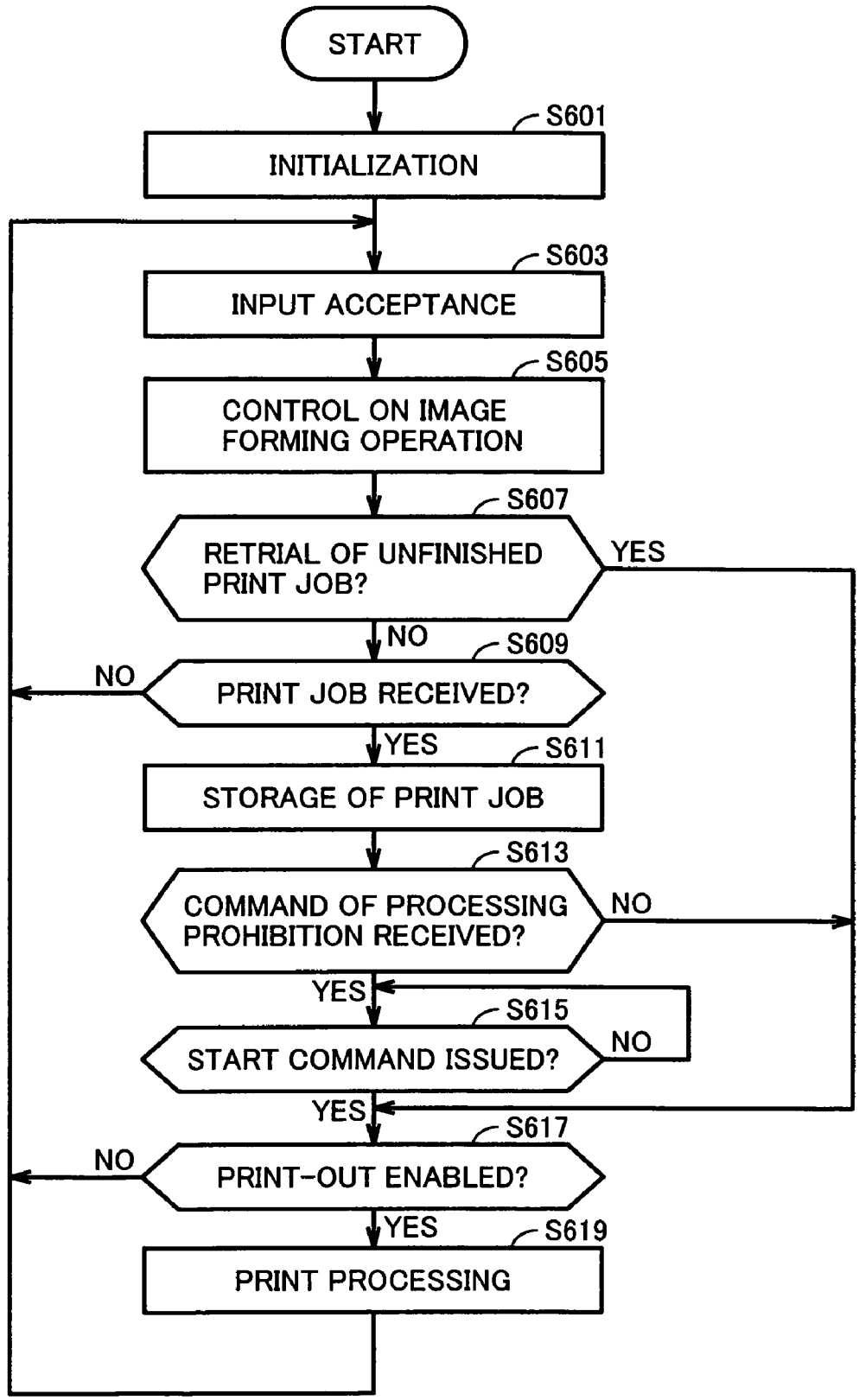
FIG. 10 is a flowchart showing processing in the image forming apparatus 8.

Image forming apparatus 8 starts the processing shown in FIG. 10 by turning on power supply or the like and, in step S601, performs initialization such as clearance of memories, setting of a standard mode and the like in control modules 110, 120 and 130.

Then, image forming apparatus 8, in step S603, performs reception processing of various kinds of input signals. Note that the input signals include, for example, input signals from key switches on operating panel 118 of image forming apparatus 8, sensor groups in image forming apparatus 8 and the like, and step S603 collectively shows reception processing of the various kinds of input signals.

Then, image forming apparatus 8, in step S605, performs processing necessary for an image forming operation and processing other than print-out start. Note that included in the processing necessary for the image forming operation are, for example, controls of various kinds of working sections such as paper feed control, operation control, photoreceptor drum control and developing unit control and the like, and the processing other than print-out start includes the processing in m2 to m5 and m12, shown in FIG. 8 and step S605 collectively shows the processing.

Then, image forming apparatus 8, in step S607, receives input of a command, from a user, of whether or not retrial of print-out processing is performed on print-out data for which the print-out processing cannot be performed though receiving a command to start print-out processing from data broadcasting receiving terminal 1.

Image forming apparatus 8, in a case where, in step S607, receiving a command of retrial through operating panel 118 from a user (YES in step S607), image forming apparatus 8 executes processing in step S617 and thereafter described later to retry print-out processing of the print-out data, part of which remains unprinted.

On the other hand, if image forming apparatus 8, in a case where, in step S607, not receiving a command of retrial through operating panel 118 from a user, receives print-out data from data broadcasting receiving terminal 1 (NO in step S607 and YES in step S609), image forming apparatus 8, in step S611, stores print-out data received from data broadcasting receiving terminal 1 into fixed memory apparatus 119.

Note that in a case where image forming apparatus 8, in step S609, does not receive print-out data from data broadcasting receiving terminal 1, image forming apparatus 8, in step S609, executes repeatedly processing from step S603 to step S609 till detecting reception of print-out data.

Then, in a case where image forming apparatus 8 receives a command of printing prohibition of the print-out data from data broadcasting receiving terminal 1 when, in step S609, receiving print data (YES in step S613), image forming apparatus 8 is kept inactive on standby till receiving a control signal associated with print-out, which is printing start data, from data broadcasting receiving terminal 1. Thereafter, if image forming apparatus 8 receives a control signal associated with print-out, which is printing start data, from data broadcasting receiving terminal 1 (YES in step S615), image forming apparatus 8, if being able to print out (YES in step S617), in step S619, reads out print-out data stored in fixed memory apparatus 119 to execute print-out processing.

Note that a case where it is determined in step S617 that print-out is disabled corresponds to a case where paper jam, paper out, troubles and the like occur in image forming apparatus 8. In this case, with an operation of a user to supplement paper sheets or the like performed, image forming apparatus 8 is enabled to print out, whereas image forming apparatus 8 is kept inactive on standby without performing print-out processing of print-out data received from data broadcasting receiving terminal 1 till a print key is turned on through operating panel 118 to input a print-out command to image forming apparatus 8 by a user even if image forming apparatus 8 restores to a state where print-out is enabled. Image forming apparatus 8, if receiving a print-out command, reads out print-out data stored in fixed memory apparatus 119 to execute print-out processing.

In a case where print-out data received by image forming apparatus 8 is print-out data received from a source other than data broadcasting receiving terminal 1, that is in a case where print-out data received by image forming apparatus 8 is print-out data received from information processing apparatus 9, image forming apparatus 8 restarts print-out of print-out data automatically when a state where print-out is disabled is cancelled.

On the other hand, in a case where image forming apparatus 8 does not receive a command of print-out prohibition of the print-out data from data broadcasting receiving terminal 1 when, in step S609, receiving print-out data (NO in step S613), image forming apparatus 8 executes processing in step S617 and thereafter to thereby execute print-out processing of print-out data received from data broadcasting receiving terminal 1.

(4) Processing in Image Forming Apparatus 100a

Description will be given of processing in image forming apparatus 100a in a case where image forming apparatus 8 included in the printing system is image forming apparatus 100a having an analog data broadcasting tuner using a flowchart of FIG. 11. Processing shown in the flowchart of FIG. 11 is realized by spreading a program stored in ROM 24 onto RAM 23 and executing the program with CPU 30 of image forming apparatus 100a.

That is, in FIG. 11, in image forming apparatus 100a, there is executed, in step S701, processing similar to the processing in data broadcasting receiving terminal 1 shown in the flowchart of FIG. 9 and print-out data, which is a print job, is produced from data separated and extracted from a data broadcasting signal multiplexed in a vertical retrace line blanking interval of a television broadcasting signal to send out the print-out data to image forming section 46. In image forming section 46, print-out of the print-out data is prohibited till image forming section 46 receives a control signal associated with print-out, which is printing start data.

Then, processing similar to the processing in image forming apparatus 8 shown in the flowchart of FIG. 10, in step S703, is executed to perform print-out processing of print-out data in image forming section 46.

Note that processing in image forming apparatus 100b in a case where image forming apparatus 8 included in the printing system is image forming apparatus 100b having a digital television broadcasting tuner is similar to the processing shown in the flowchart of FIG. 11. That is, in image forming apparatus 100b as well, by spreading a program stored in ROM 61 onto RAM 60 and executing the program with CPU 58, there is realized processing similar to the processing shown in the flowchart of FIG. 11.

By executing processing as described above in a printing system of the present invention, print-out processing can be surely performed in the printing system when a broadcasting program in screening reaches a specific screen image even if the broadcasting program is interrupted or postponed by occurrence of a disaster or a serious incident. That is, since, in the printing system, a control signal commanding print-out is sent out to an image forming apparatus in correspondence to actual broadcasting contents (one frame included in a moving picture) even if the start of broadcasting is delayed from scheduled, an image can be printed out at a time corresponding to broadcasting contents. Therefore, for example, in a case where a broadcasting program is an educational program, no problem arises that a test paper sheet for a small test to be performed in the latter half of the broadcasting program is printed out in advance and thereby a lecture participant knows a problem with the result that no correct result of the small test is obtained. Furthermore, no problem arises that, for example, in a case where presentation is performed by broadcasting as well, a document is printed out prior to a scene where the document to be printed out, thereby reducing an effect of the presentation.

In the printing system, even in a case where a delay occurs in print-out processing caused by a factor in image forming apparatus 8, image forming apparatus 8 keeps to store print-out data till the factor is cancelled and after the factor is cancelled, receives a command from a user to print out the stored print-out data. Therefore, no problem arises that, for example, in a case where print-out processing cannot be performed because of paper jam even if printing start data is received during a program in screening, an image after the end of the program is automatically printed out after the paper jam is cancelled, leading to wasteful print-out.

By executing the processing in the printing system, a command of the start of print-out can be issued to image forming apparatus 8 at an earlier timing in consideration of a print preparation time including a weight time for image forming apparatus 8, a time to perform RIP (Raster Image Processor) development and the like. Hence, print-out processing can be realized at a necessary timing.

By executing the above processing in a example modification of the printing system, a command of the start of print-out can be issued to image forming apparatus 8 at an earlier timing in consideration of a restoration time from the power saving mode of image forming apparatus 8. Hence, print-out processing can be realized at a necessary timing.

A print-out method in the printing system can also be provided as a program. Such a program can also be provided as a program product by recording the program on computer readable recording media such as a flexible disk, a CD-ROM (Compact Disc-ROM), ROM, RAM and a memory card, as accessories to a computer. Alternatively, a program can also be provided storing it on a recording medium such as a hard disk built in a computer. Furthermore, a program can also be provided by downloading through the network.

A provided program product is installed in a program storage section such as a hard disk and executed. Note that a program product includes a program itself and a recording medium on which the program is recorded.

According to an aspect of the present invention described above, the following configurations are conceived as other example configurations of the present invention.

(1) A data broadcasting receiving terminal including: reception means receiving a data broadcasting signal including print-out data and a control signal associated with print-out; detection means detecting the print-out data and the control signal associated with print-out from the received broadcasting signal; first notification means notifying an image forming apparatus of the detected print-out data; and commanding means issuing a print-out command for print-out data to the image forming apparatus based on the detected control signal associated with print-out.

(2) The data broadcasting receiving terminal according to the (1), further including acquirement means acquiring at least one of a first time from when receiving print image data from the image forming apparatus till print-out data starts and a second time from a state where print-out is disabled till the state transitions to a state where print-out is enabled, wherein a timing is determined at which a print-out command for print-out data is issued to the image forming apparatus in the commanding means.

(3) The data broadcasting receiving terminal according to the (1) or (2), wherein the control signal associated with print-out includes information indicating a timing of print-out of print-out data and determines a timing at which a print-out command for print-out data is issued to the image forming apparatus in the commanding means based on a timing of printing print-out data included in a control signal associated with print-out.

(4) An image forming apparatus including: acquirement means acquiring print-out data from data broadcasting receiving terminal; storage means storing the acquired print-out data into a memory apparatus; reception means receiving a control signal associated with print-out of print-out data from the data broadcasting receiving terminal; and processing means processing print-out data stored in the memory apparatus based on the received control signal associated with print-out.

(5) The image forming apparatus according to the (4), wherein the processing means is one of means processing print-out of print-out data stored in the storage apparatus and means for erase processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   a reception section receiving in an order, data broadcasting signals, formed of a pair of image data, including a frame configuring a moving picture, and private data, including print-out data and a control signal involved in print-out;
   a detection section detecting said print-out data and said control signal from said received data broadcasting signal;
   a storage section storing said detected print-out data into a memory apparatus; and
   an output section printing out said print-out data stored in said memory apparatus in response to a control signal including an instruction to start printing said print-out data stored in said memory apparatus,
   wherein said control signal including an instruction to start printing said print-out data is included in private data forming a pair with image data included in a data broadcasting signal received at a time different from a time at which a data broadcasting signal including image data forming a pair with private data including said print-out data is received.

2. The image forming apparatus according to claim 1, wherein
   in a case where said control signal including an instruction to start printing is detected in said detection section in a state where print-out is disabled, print-out of said print-out data is inactive on standby until a print-out instruction is entered by a user after said state where print-out is disabled is cleared.

3. The image forming apparatus according to claim 1, further comprising:
   a transition section, in response to detection of said print-out data in said detection section in a second state other than a first state where printout is enabled, transitioning said output section from said second state to said first state.

4. The image forming apparatus according to claim 1, further comprising:
   an end detecting section detecting the end of data broadcasting from a received data broadcasting signal; and
   an erasure section, when the end of said data broadcasting is detected, erasing said print-out data stored in said memory apparatus.

5. A printing system comprising a data broadcasting receiving terminal and an image forming apparatus,
   said data broadcasting receiving terminal including:
   a reception section receiving in an order, data broadcasting signals, formed of a pair of image data, including a frame configuring a moving picture, and private data, including print-out data and a control signal involved in print-out;
   a detection section detecting said print-out data and said control signal from said received data broadcasting signal;
   a first notification section notifying said image forming apparatus of said detected print-out data; and
   a second notification section notifying said image forming apparatus of said control signal; and
   said image forming apparatus including:
   a storage section storing said print-out data notified from said data broadcasting receiving terminal by said first notification section in a memory apparatus; and
   an output section printing out said print-out data stored in said memory apparatus in response to a notification of a control signal including an instruction to start printing said print-out data stored in said memory apparatus,
   wherein said control signal including an instruction to start printing said print-out data is included in private data forming a pair with image data included in a data broadcasting signal received at a time different from a time at which a data broadcasting signal including image data dorming a pair with private data including said print-out data is received.

6. The printing system according to claim 5, wherein when said control signal including an instruction to start printing is notified from said data broadcasting receiving terminal by said second notification section in a state where print-out is disabled, said image forming apparatus is inactive on standby till a print-out instruction is entered by a user after said state where print-out is disabled is cleared.

7. The printing system according to claim 5, wherein said image forming apparatus further including:

a transition notifying section notifying said data broadcasting receiving terminal of transition from a first state where print-out is enabled to a second state other than said first state, and a transition section, when said print-out data is notified from said data broadcasting receiving terminal by said first notification section in said second state, transitioning said output section from second state to said first state.

8. The printing system according to claim 5, wherein said image forming apparatus further including:

a transmission section, when said print-out data is notified from said data broadcasting receiving terminal by said first notification section, transmitting a first time data, which is a time until the start of print-out is enabled, to said data broadcasting receiving terminal, and said data broadcasting receiving terminal further including:

an extraction section extracting from said detected control signal a second time data, which is a time difference between a timing at which video information included in said data broadcasting signal is reproduced and a timing at which said detected print-out data is printed out; and a determination section determining a timing at which said control signal out including an instruction to start printing is notified to said image forming section in said second notification section based on said first time data transmitted by said transmission section of said image forming apparatus and said extracted second time data.

9. The printing system according to claim 5, wherein said data broadcasting receiving terminal further including:

an end detecting section detecting the end of data broadcasting from said received data broadcasting signal; and an end notifying section notifying said image forming apparatus of said detected end of data broadcasting, and said image forming apparatus further including:

an erasure section erasing said print-out data stored in said memory apparatus when said end of broadcasting is notified from said data broadcasting receiving terminal in said end notifying section.

10. An information processing apparatus comprising:

a reception section receiving in an order, data broadcasting signals formed of a pair of image data, including a frame configuring a moving picture, and private data, including print-out data and a control signal involved in print-out;

a separation section separating said image data and said print-out data from said received data broadcasting signal;

a transmitting section transmitting said separated print-out data to an image forming apparatus; and a commanding section issuing a command for printing out said print-out data to said image forming apparatus in response to a control signal including an instruction to start printing said print-out data, wherein said control signal including an instruction to start printing said print-out data is included in private data forming a pair with image data included in a data broadcasting signal received at a time different from a time at which a data broadcasting signal including image data forming a pair with private data including said print-out data is received.

11. A computer readable medium storing data transmission program for causing a computer to execute data transmission processing comprising:

detecting print-out data from a received data broadcasting signals, formed of a pair of image data, including a frame configuring a moving picture, and private data, including print-out data and a control signal involved in said print-out;

sending out said detected print-out data to an image forming apparatus;

detecting a control signal including an instruction to start printing said print-out data from private data forming a pair with image data included in a data broadcasting signal received at a time different from a time at which a data broadcasting signal including image data forming a pair with private data including said print-out data is received; and issuing a print-out command for said print-out data to said image forming apparatus in response to said control signal including an instruction to start printing is detected.

12. The computer readable medium storing a data transmission program according to claim 11, wherein said data transmission processing further comprises:

detecting the end of said data broadcasting from a received data broadcasting signal, and commanding erasure of said print-out data to said image forming apparatus when said end of data broadcasting is detected.

* * * * *